United States Patent
Harder

(10) Patent No.: US 9,946,854 B2
(45) Date of Patent: *Apr. 17, 2018

(54) METHOD FOR PROCESSING DATA

(71) Applicant: Whitecryption Corporation, Wilmington, DE (US)

(72) Inventor: Wulf Harder, Riga (LV)

(73) Assignee: Whitecryption Corporation, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 15/638,084

(22) Filed: Jun. 29, 2017

(65) Prior Publication Data

US 2017/0364668 A1    Dec. 21, 2017

Related U.S. Application Data

(63) Continuation of application No. 15/052,711, filed on Feb. 24, 2016, now Pat. No. 9,721,075, which is a
(Continued)

(51) Int. Cl.
*G06F 9/00* (2006.01)
*G06F 21/14* (2013.01)
(Continued)

(52) U.S. Cl.
CPC .............. *G06F 21/14* (2013.01); *G06F 21/12* (2013.01); *G06F 21/16* (2013.01); *G06N 7/00* (2013.01)

(58) Field of Classification Search
None
See application file for complete search history.

(56) References Cited

U.S. PATENT DOCUMENTS 4,866,605 A * 9/1989 Nakano ............... G06F 17/5013
703/13
4,922,413 A * 5/1990 Stoughton ............. G06F 9/4436
712/26
(Continued)

FOREIGN PATENT DOCUMENTS

WO    WO2004097734    11/2004

OTHER PUBLICATIONS

Office Action, U.S. Appl. No. 10/554,168, dated Jun. 23, 2015.
(Continued)

*Primary Examiner* — Eric Chen
(74) *Attorney, Agent, or Firm* — Phillips Ryther & Winchester; John P. Davis

(57) ABSTRACT

Method for processing data, in which a Petri net is encoded, written into a memory and read and executed by at least one instance, wherein transitions of the Petri net read from at least one tape and/or write on at least one tape symbols or symbol strings, with the aid of at least one head. [FIG. 1]. In an alternative, data-processing, co-operating nets are composed, the composition result is encoded, written into a memory and read and executed from the memory by at least one instance. In doing this, components can have cryptological functions. The data-processing nets can receive and process second data from a cryptological function which is executed in a protected manner. The invention enables processing of data which prevents semantic analysis of laid-open, possibly few processing steps and which can produce a linkage of the processing steps with a hardware which is difficult to isolate.

10 Claims, 29 Drawing Sheets

Related U.S. Application Data continuation of application No. 10/554,168, filed as application No. PCT/EP2004/003561 on Apr. 3, 2004, now Pat. No. 9,275,202.

(51) Int. Cl.
*G06F 21/16* (2013.01)
*G06F 21/12* (2013.01)
*G06N 7/00* (2006.01)
*H04K 1/00* (2006.01)
*H04L 9/28* (2006.01)

(56) References Cited

U.S. PATENT DOCUMENTS

| | | | | |
|---|---|---|---|---|
| 5,029,080 | A * | 7/1991 | Otsuki | G06F 9/4436 712/201 |
| 5,257,363 | A * | 10/1993 | Shapiro | G06F 17/5013 700/83 |
| 6,226,749 | B1 | 5/2001 | Carloganu et al. | |
| 6,779,112 | B1 * | 8/2004 | Guthery | G06F 21/31 713/170 |
| 7,478,233 | B2 * | 1/2009 | Olson | G06F 21/57 380/280 |
| 9,721,075 | B2 | 8/2017 | Harder | |
| 2003/0055811 | A1 * | 3/2003 | Stork | G06Q 10/10 |
| 2004/0015719 | A1 * | 1/2004 | Lee | H04L 63/0227 726/23 |

OTHER PUBLICATIONS

Office Action, U.S. Appl. No. 10/554,168, dated Nov. 24, 2014.
Office Action, U.S. Appl. No. 10/554,168, dated May 14, 2014.
Office Action, U.S. Appl. No. US 10/554,168, dated Dec. 24, 2013.
Office Action, U.S. Appl. No. 10/554,168, dated May 29, 2013.
Office Action, U.S. Appl. No. US 10/554,168, dated Dec. 8, 2011.
Office Action, U.S. Appl. No. US 10/554,168, dated May 17, 2011.
Office Action, U.S. Appl. No. US 10/554,168, dated Sep. 22, 2010.
Office Action, U.S. Appl. No. 10/554,168, dated Dec. 23, 2009.

* cited by examiner

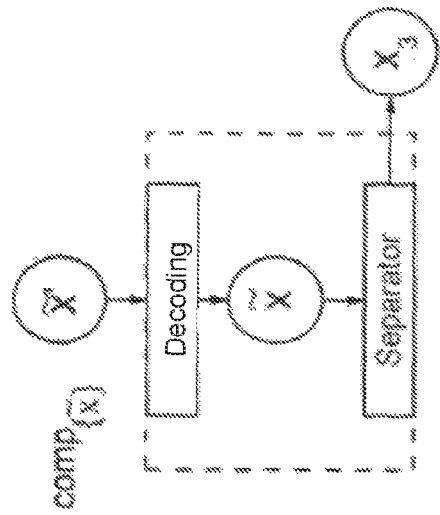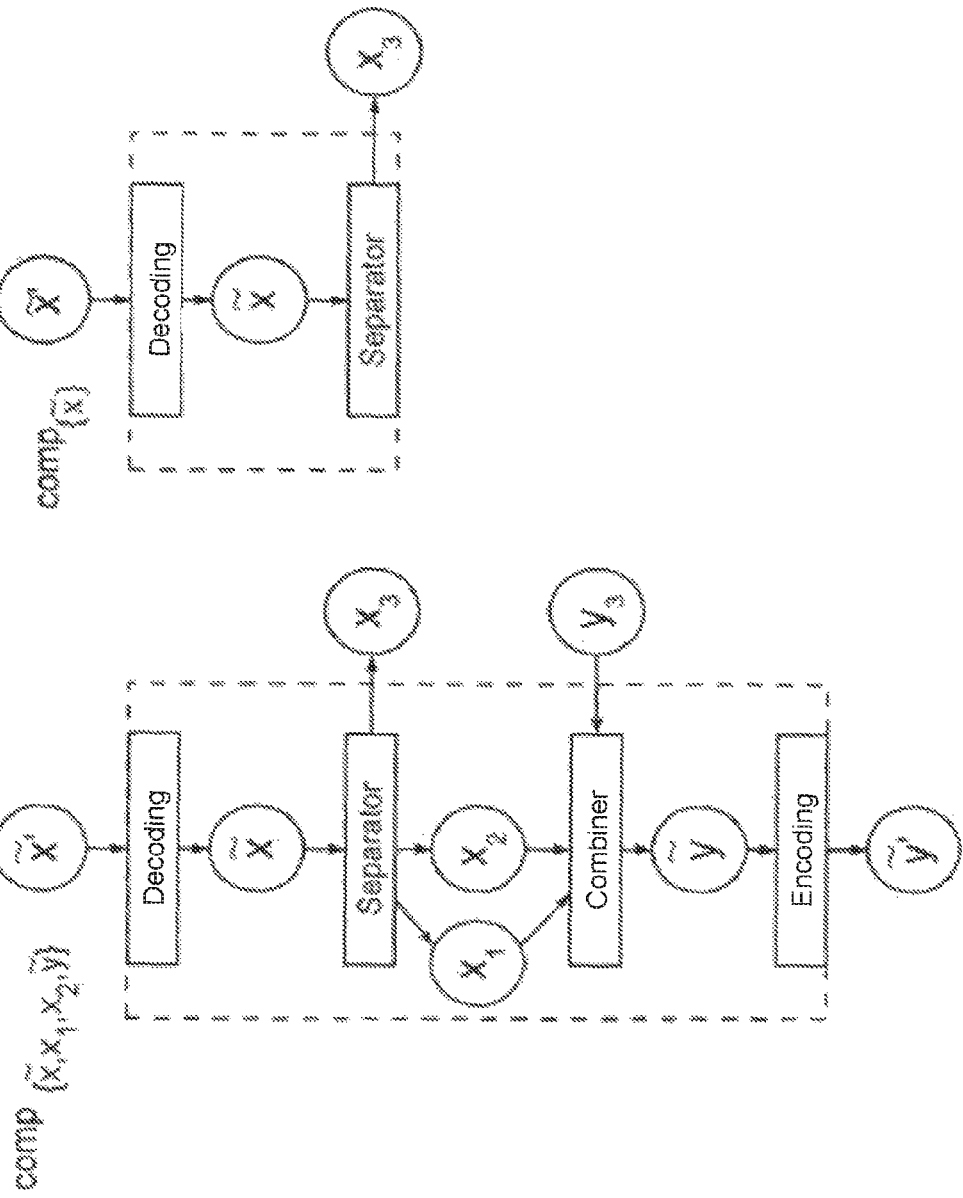

METHOD FOR PROCESSING DATA

RELATED APPLICATIONS

The present application is a continuation of U.S. patent application Ser. No. 15/052,711 filed Feb. 24, 2016, and titled "METHOD FOR PROCESSING DATA," which is a continuation of U.S. patent application Ser. No. 10/554,168 filed Jul. 25, 2006, and titled "DATA PROCESSING METHOD", which claims the benefit of Patent Cooperation Treaty No. PCT/EP2004/003561, filed Apr. 3, 2004, and titled "DATA PROCESSING METHOD," each of which is incorporated herein by reference in their entireties.

TECHNICAL BACKGROUND

Software and contents, like music, e.g., can nowadays be distributed via the internet at low cost. A plurality of copy protection methods for the enforcement of company concerns has been developed. The protection of contents is difficult, when the consumer is that person who expects the contents in a not encoded form. While consuming, each content can be recorded in an analogue form, digitized and then be copied. This problem is called the analogue hole. In the present state of the art, illegal copying of contents can be only obstructed, but not prevented. The problem of the analogue hole does not exist in the execution of software. In fact, the user of a software is the person; the direct consumer, however, is a computer or a processor. Therefore it is possible to alter the software without obstructing effects for the user by copy protection mechanisms. With the term software protection, the protection of the intellectual property that is connected with the software is to be understood. To this belongs the knowledge about the application field of the software, about specific problems of that field and the solutions thereof, which are implemented in the software. Also, all the methods for creating the software, which may be specific for the problem or the solution, belong to the intellectual property that is worth to be protected. Frequently, an originator wants to protect his knowledge and wants to secure that only he/she himself can further develop the software. For the protection of the quoted values, it is necessary to prevent any reconstruction (reverse engineering) of the source code or an equivalent program code with the aid of the analysis of the machine code of the software, or to make sure that that the expenditure of that analysis is greater than that for the development of the software. Software protection may include the prevention of unauthorized use of the software. Protection methods and devices created for this purpose are called software copy protection, in spite of the fact that many methods and devices do not prevent copying, but only the use of the software. Through this, illegal copying is demotivated.

BRIEF SUMMARY OF THE INVENTION

In known copy protection methods, data are transmitted from the application to a protected hardware, are then encoded by the hardware and thereafter decoded by the application or compared with data which were encoded before compiling the application. The application works only in a correct manner when the data had been correctly encoded by the hardware. A method for by-passing this protection is the removal of the comparison of the data from the machine code. There are countermeasures against this: the application examines the integrity of the machine code at intervals, so that an aggressor has to find this examination, too. Therefore, a more simple way to by-pass the copy protection is the following: the aggressor observes the communication between the application and the hardware. He establishes a table with the interchanged data and simulates the hardware with the aid of this table in a newly produced hardware driver. A countermeasure is the implementation of many communication processes with the hardware. In doing so, numbers at random are also sent to the hardware, so that a table would become too large. The values encoded by the hardware are processed by the application only seemingly. The aggressor is either now convinced that he has to find and remove the integrity tests mentioned above, or he observes the communication processes. He writes each value sent to the hardware into a large memory and examines which values were sent plural times. With high probability, only these values are actually processed by the application. The hardware simulation uses then a table with these values. If no value for a certain input is found in the table in the simulation, it is answered with a random number, because the application might evaluate and recognise the straggling of the answers. The table is significantly smaller than the memory used before.

In the software copy protection method described in [4], a crypto function is calculated in a connector assembly connected to the PC and parallel to this in the protected application. Partial functions of this crypto function can be inserted into the application on different positions, so that extraction is not possible without a semantic analysis of the program code. With the aid of the output values of the crypto function, calculations of the software are made erroneous and corrected with the aid of the output values of the connector assembly shortly before they can have harmful effects on the course of the application. Without the connector assembly, which is not reproducible for the aggressor, the application can not be used. The described method has the disadvantage that the integration of the partial functions into the software which is to be protected is very laborious.

In a further copy protection method, parts of the program which is to be protected are kept in a not readable memory of a smartcard and are executed by the smartcard controller. The transmission of these parts takes place only in an encoded manner. Examples of such processors are devices in the form of USB-apparatuses of the companies Syncrosoft [12] and Sospita [11]. The encryption of the software in this method prevents reverse engineering, too.

A disadvantage of executing the program code in a special processor, which is perhaps externally connected to the PC, is the bad throughput. In fact, this is sufficient for executing digital rights management operations, however, the execution of essential parts of an application which is to be protected is too slow in many cases. The integration of devices for program decoding and protected execution in a PC processor would be very expensive and would lead to problems with standardisation and compatibility in the development and spread of new processor versions.

In [10], a method against reverse engineering of software is described, which cloaks logical connections between elementary operations of the processor and data streams by the introduction of complex addressing mechanisms. One disadvantage of the invention is shown in the attempt to protect object-oriented software. In general, software that had been developed in an object-oriented manner contains very short methods, which are constituted by a small number of program instructions and realise in most cases very simple data streams with a small number of variables. At least in this case, the described method is not effective. Further, no possibility is known for this method which produces a hardly detachable linkage to a hardware and thus prevents copying of the transformed software.

The present invention is based on the objective to provide methods for processing data which obstruct or prevent semantic analysis of laid-open, possibly few processing steps, and which enables a linkage of the processing method with a hardware which is hardly detachable for an aggressor. The implementation of the method to predetermined processing steps should be possible at low expenditure.

According to claim 1, a Petri net is encoded, the transitions of which exchange symbols or symbol strings with the aid of at least one or plural heads with at least one tape. The encoding of the Petri net is written into a memory and read and executed by at least one instance. Petri nets and the terms "position", "transition" and "mark" are described in [6] and [8]. The terms "head" and "tape" are used in conformity with the terms describing a Turing machine, the tape being a finite one for technical reasons, in difference to the model of the Turing machine. Turing machines are described in [5], for instance. Preferably, the head is moved on the tape at each reading and writing operation. However, the movement of the head may also be controllable. Further, the existence of at least two heads is advantageous for the operation speed, because most operations work with at least two operands. A tape may be a register of a processor or a memory cell of a RAM. A head may be a register with a mask for the masking of values of the tape. With the execution of a Petri net, the switching of transitions of the Petri net is to be understood here. By the execution of the Petri net, which works on tapes, data are processed. The memory and the executing instance or the executing instances, respectively, can be realised in many ways. For the concept of the invention, it is important that the semantics which is behind the Petri net is difficult to analyse even when the Petri net is known. Preferably, the generation and the encoding of the Petri net take place in a memory different from that one for the execution. The encoding of the Petri net, the heads, tapes, fields and symbols is possible in many variants. An aggressor who wants to gather information about the semantics of the Petri net has only the possibility to compare the Petri net with those Petri nets he already knows, or to guess the semantics with the aid of input and output examples. The Petri net can receive and process symbols or symbol strings from a cryptological function. The cryptological function can be fixedly attached to the device which executes the Petri net, so that a linkage of the processing method with a hardware is created which is difficult to detach for an aggressor.

In one embodiment of the invention, the Petri net, the head or the heads and the tape or the tapes form an universal Turing machine. A Petri net may form the finite control of the Turing machine. On the tape of the universal Turing machine, the encoding of a Turing machine or of an universal Turing machine is stored. In the latter case, a Turing machine or an universal Turing machine may again be stored on the tape of the last-mentioned universal Turing machine, and so forth. This recursion may be set forth. Semantic analysis of the processing steps in the execution of the Petri net is increasingly made difficult by every recursion.

In a further embodiment of the method, the Petri net exchanges symbols or symbol strings with one or plural further Petri nets, respectively, via channels. By doing so, the complexity can be increased and thus the application of analysis can be made difficult.

According to a further embodiment of the invention, the switching of transitions can be rapidly performed with the aid of tables. In analogy to sequential machines, as described in [2] for instance, a derived mark or a derived state, respectively, and an output may be rapidly determined from a table on the basis of a mark or a state, respectively, and an input. The inputs or outputs, respectively, may also take place optionally.

A speed increase when switching the transitions may be achieved by a method in which a processor performs the switching of a transition with an instruction, an instruction importing the tables as an operand. The instruction set of a processor may contain plural such instructions.

The outputs of a Petri net can be inputted into another Petri net and can be further processed. A system consisting of plural Petri nets is a co-operation. In a further embodiment of the invention, a co-operation of Petri nets forms a Turing machine. The fields and tapes and the finite control of the Turing machine are encoded as Petri nets, which can exchange symbols or symbol strings via channels and can synchronize themselves.

The translation of this software into a Petri net or a co-operation of Petri nets or a Turing machine, respectively, is advantageous for the protection of software. This translation process could be performed by a special compiler in an automatic fashion.

In one embodiment of the method, the execution of a co-operation of Petri nets may take place by the execution of a composition instruction. In doing so, a Petri net is created which has the same input/output behaviour as the co-operation of the Petri nets, with the limitation that outputs may take place with a delay. Through this, the desired functionality of the created Petri net is not necessarily impaired.

An alternative solution of the objective on which the invention is based provides according to claim 9 that data-processing, co-operating nets are composed, the composition result is encoded, written into a memory and read and executed from the memory by at least one instance, wherein the composition result is a net which is equivalent to its components with respect to input/output behaviour, except output delays. Exempted from this is a public key encryption method of [1] and [3], in which the composition result of a composition of finite automates form a public key. In the present invention, it is dealt with the general processing of data, taking into account the objective on which the present invention is based. The objective is resolved because a semantic analysis of a composition result is difficult without knowing the components. In many cases, a decomposition is a hard problem or np-hard problem, respectively.

The feature of claim 9 does not delimit which kinds of data-processing, co-operating nets are composed. It is known that many nets of the one kind can be simulated by nets of another kind or are equivalent to each other, respectively. For instance, in [7] and [9] it has been shown that recursive McCulloch-Pitts nets, a special form of artificial neuronal nets, are equivalent to finite automates. Finite automates can be described by B/E nets again. B/E nets are special Petri nets. As is naturally, any description of the composition depends on the formal definition of the nets, and many variants of the composition that differ in content can be defined, irrespective of this definition. Claim 9 also includes variants of compositions which are based on the same concept of the invention.

The components and the composition result may be Petri nets which send and receive symbols or symbol strings via optionally existing channels. In one embodiment of the invention, every component forms a sequential machine with optionally plural input channels and optionally plural output channels. Let C be a denumerable set of channels, $\Delta$ a finite set of finite alphabets, $\gamma:C\to\Delta$, $\Omega=(C, \Delta, \gamma)$ a communication rule, $$E_\Omega=\{e|e=\{(c,\sigma)|\sigma\epsilon\gamma(c)\wedge((c,\sigma_1)\epsilon e \wedge (c,\sigma_2)\epsilon e \Rightarrow \sigma_1=\sigma_2)\}\}\cup\{\emptyset\}$$

a set of input/output events and S a finite set of states. A system of sequential machines is defined as $$M_\Omega:=\{(S,E_\Omega,\delta,\beta,s_0)|\delta:R\to S\wedge \beta:R\to E_\Omega \wedge R\subset S\times E_\Omega \\ \wedge (\forall[(s,x),y]\epsilon\beta\forall(c_x,\sigma_x)\epsilon x\forall(c_y,\sigma_y)\epsilon y:c_x\neq c_y) \\ \wedge s_0\epsilon S\}.$$

A set of synchronization channels is a parameter of the composition function. The transitions of the machine which is to be composed switch depending from an imaginary global clock and there is no by-passing. A "rendezvous" between sender and receiver of symbols should be possible, which requires that the components can wait for each other. This is realised by switching an "empty transition" of the waiting machine. The empty transition does not read anything nor does it write anything. Such transitions exist in non-deterministic automates with $\lambda$-movements [5]. The $\lambda$-movements are called $\epsilon$-movements here. In the non-deterministic sequential machines to be composed as B/E nets, there are plural possible switching sequences or serial processes [6]. Each possible switching sequence corresponds to one composed sequential machine. The composition function is a mapping in a power set of sequential machines. Let be $\Omega=(C, \Delta, \gamma)$ a communication rule and B with $B\subset$ a set of internal synchronization channels. The composition $comp_B:M_\Omega{}^n\to 2^{M_\Omega}$ is defined as:

$$comp_B := \{((K_1, \ldots, K_n), \tilde{K}) \mid \\ (K_1, \ldots, K_n) = ((S_1, E_\Omega, \delta_1, \beta_1, s_{0_1}), \ldots, (S_n, E_\Omega, \delta_n, \beta_n, s_{0_n})) \\ \wedge \exists T = \{((x_1, \ldots, x_n), (y_1, \ldots, y_n), (s_1', \ldots, s_n'), \tilde{x}, \tilde{y}) \mid \\ ([(s_{0_1}, x_1), s_1'], \ldots, [(s_{0_n}, x_n), s_n']) \in \delta_1 \times \ldots \times \delta_n \\ \wedge ([(s_{0_1}, x_1), y_1], \ldots, [(s_{0_n}, x_n), y_n]) \in \beta_1 \times \ldots \times \beta_n$$

$$\wedge \exists H_x = \bigcup_{i\in\{1,\ldots,n\}} x_i \exists H_y = \bigcup_{i\in\{1,\ldots,n\}} \beta_i(x_i):$$

$$H_x \in E_\Omega \wedge H_y \in E_\Omega \\ \wedge \forall(c, \sigma): (c \in B \Leftrightarrow (c, \sigma) \in H_x \cap H_y) \\ \wedge \tilde{x} = H_x \setminus H_y \wedge \tilde{y} = H_y \setminus H_x \\ \exists \tilde{M}_\Omega' = \{\tilde{K}' \mid \exists((x_1, \ldots, x_n), (y_1, \ldots, y_n), (s_1', \ldots, s_n'), \tilde{x}, \tilde{y}) \in T: \\ \tilde{K}' = comp_B ([(S_1, E_\Omega, \delta_1, \beta_1, s_1'), \ldots, (S_n, E_\Omega, \delta_n, \beta_n, s_n')])\}: \\ \tilde{K} = (\tilde{S}, E_\Omega, \tilde{\delta}, \tilde{\beta}, \tilde{s}_0)$$

$$\wedge \tilde{S} = (s_{0_1}, \ldots, s_{0_n}) \cup \bigcup_{(\tilde{S}', E'_\Omega, \tilde{\delta}', \tilde{\beta}', \tilde{s}'_0) \in \tilde{M}'_\Omega} \tilde{S}'$$

$$\wedge \tilde{\delta} = \{[((s_{0_1}, \ldots, s_{0_n}), \tilde{x}), (s_1', \ldots, s_n')] \mid \\ ((x_1, \ldots, x_n), (y_1, \ldots, y_n), (s_1', \ldots, s_n'), \tilde{x}, \tilde{y}) \in T\}$$

$$\bigcup_{(\tilde{S}', E'_\Omega, \tilde{\delta}', \tilde{\beta}', \tilde{s}'_0) \in \tilde{M}'_\Omega} \tilde{\delta}'$$

$$\wedge \tilde{\beta} = \{[((s_{0_1}, \ldots, s_{0_n}), \tilde{x}), \tilde{y}] \mid \\ ((x_1, \ldots, x_n), (y_1, \ldots, y_n), (s_1', \ldots, s_n'), \tilde{x}, \tilde{y}) \in T\}$$

$$\bigcup_{(\tilde{S}', E'_\Omega, \tilde{\delta}', \tilde{\beta}', \tilde{s}'_0) \in \tilde{M}'_\Omega} \tilde{\beta}'$$

$$\wedge \tilde{s}_0 = (s_{0_1}, \ldots, s_{0_n})\}.$$

In the composition according to this definition, there are two kinds of channels: the set of channels A, in which each channel is used by one machine only, and a set of synchronisation channels $\overline{B}$, in which each channel is used by at least two machines. In the composition, the set of synchronisation channels $\overline{B}$ has to be subdivided into internal and external synchronisation function channels. $B\subseteq\overline{B}$ is the set of those synchronisation channels which are no more used in the composed machine. In many applications there is $B=\overline{B}$. An essential difference between internal and external synchronisation channels is that a transition with an internal synchronisation channel can switch only when a symbol is exchanged with a synchronised transition via this channel. In an external synchronisation channel, the condition is not as sharp: the input or output on the channel must not be incompatible with a synchronised transition. As a consequence, the synchronised transition does not have to work with that channel. Via an external synchronisation channel, symbols can be exchanged with the external world. If transitions are to be internally synchronised with an external synchronisation channel, additional internal synchronisation channels have to be established. One possible recursive composition algorithm works as follows: a composition routine with the starting states of the machine which is to be composed is accessed. In this routine, the sequential set of the starting states is entered as a composed state into a list of composed states. Then, a set of compatible transitions (one transition for each component) is sought after, which each have the starting state as the input position. Transitions are compatible when all the sets of events which are assigned to these transitions are pairwise compatible and each symbol which is written or read, respectively, by a machine on an internal synchronisation channel, is written or read, respectively, by another machine. Two sets of events are compatible when all the events are pairwise compatible or when at least one set is empty. The empty set of events is compatible with every other set of events. Two events of an internal or external synchronisation channel, respectively, are compatible when they either pertain to different channels or when the same symbol is read by the one machine and is written by the other machine, or is read and written by both machines, respectively. For instance, it is excluded that two machines write different symbols on one channel at the same time. For each found set of compatible transitions, the sequential set of the output positions of the transitions is entered into the list of composed states as a composed state, and is input as starting states into a recursive call of the composition routine in the case that the composed state had not already been contained in the list. When the composed state was in the list already, the composition routine is ended. The algorithm ends when no more new composable states are found.

The information about the by-passing is lost in the composition comp. In order to take by-passing into account, the composition rule has to be modified. Thereafter, only transitions with synchronization channels are combined into one transition.

Composition results have often equivalent states. When the products of composition results are processed further in other compositions, such redundancies are undesirable. Therefore one aims for finding equivalent machines with a minimal number of such states. The mapping of the minimalisation is designated by a function min: $M_\Omega \to M_\Omega$ in the following.

After a composition, undesired compositions with empty sets of events are often generated. These transitions can be replaced by a position-edged roughening (explication of this term in [6]), wherein the edges are the entrance- and exit positions of the transition. This is repeated so often until there are no more empty transitions in the machine. This mapping is designated by a function red: $M_\Omega \rightarrow M_\Omega$ in the following.

The control stream and the structure of a Turing machine can be cloaked by composing some constituents of the Turing machine. For instance, groups of deliberate fields of different tapes could be composed. Fields of tapes can be also composed with the program or with reading heads. Further combinations, also with further components which are not constituents of the Turing machine, may be conceived.

In a further embodiment of the method, data-processing nets which are to be composed are formed by a translation of algorithms. Through this, decomposition and analysis of algorithms is obstructed or prevented.

In a further embodiment of the method, at least one of the data-processing nets which are to be composed is a cryptological component. When this component is generated at random and is kept secret, decomposition of the composition result is significantly aggravated or impossible, in particular when plural components are cryptological components with different tasks. This method is suited for encoding sequences of operations. One operation reads the operands and writes a result. An aggressor who wants to gather knowledge about the operation has the possibility to compare the net which represents the operation with nets he knows, or he/she tries to build a model of the operation with the aid of input- and output examples, so that the operation and the model show equivalent input/output behaviour. Both is prevented when the values are encoded and are processed in the encoded state. This is possible by composing the nets for decoding of the operands with the net of the operation and a net for encoding the result. It must be possible to exchange values with the external world in an uncoded manner. Inputs are not decoded in this case. In an analogous way, outputs are not encoded. In the case that Petri nets are used and a stream encoding method is used for decoding and encoding, which processes the input symbol strings in only one direction and imports a symbol and writes a symbol with each transition, the encryption does not require additional time, because every transition of the composition result is a merger of transitions of the components. The upper limit for the number of states of the composition result is the product from the number of states of every component. Every output of an encoded operation should have an individual encoding, so that an aggressor cannot conclude on the functionality of the operations by testing different concatenations of operations.

In a further form of realisation of the method, components can deflate data and/or insert watermarks into the data. A watermark is an identification feature or a certificate, which is added to data without obstructing the use of these data. This method is suited in the distribution of data like audio and/or video data, e.g., to many end-consumers. The watermarks can be inserted into the data at the end-consumer, when the data are decoded. Preferably, the decoding and the watermark are individual with respect to the end-consumer. In this, the encoding performed previously has not necessarily to be individual with respect to the end-consumer. The decoding can be coupled to a special, hardware-protected cryptological function, the function values of which are individual with respect to the end-consumer.

In a further form of realisation of the method, registers can be summarised in a register database and can be interlaced by doing so. With interlacing it is thought that an aggressor cannot change a register value without changing the value of another register of the database. The integrity of the register contents can be ensured for a period in which at least one value which is essential for the correct running of the program is stored in a register of a database. An important part of a writing operation is a machine which is called a combiner in the following. A combiner maps plural data streams of different channels in a reversible manner, which are each one assigned to one register of the register database, onto a data stream of one channel. The product of the amounts of the sets of symbols of the incoming data streams is an upper limit for the amount of the set of symbols of the output of the combiner. It is possible that not all combinations of symbols appear on the input channels. The data stream generated by a combiner is encoded. This is better than to encode the data streams which enter the combiner, because the set of symbols of the output of the combiner is greater than the set of symbols of the components. Stream encoding with a greater set of symbols is more efficient than with a smaller set of symbols. In order to extract the data of a register from the data stream of a combiner, the data stream is first decoded. Thereafter, the data of individual registers can be read, after use of the separator. Besides to the interlacing of registers, storing of data in a register database has the advantage that data streams can be hidden. Many operations can work subsequently on a register database without that intermediate results exit the register database. In order to cloak the state of a register database, a pseudo random number can be written into a register, which is changed at each reading and writing access to the register database. The pseudo random number generator is then a component of the register database. Changing data from registers which are not present in the register database can be inputted into this generator.

In a further form of realisation of the method, a cryptological component receives data from a function which is executed in a protected manner and processes them, the composition result working not or erroneous when no or erroneous data are received from the cryptological function. Through this, a coupling of the composition result with the cryptological function is achieved which is difficult or impossible to separate, which is suited to prevent unauthorised use of the software, for instance, when the composition result is needed for the software and the execution of the cryptological function is not freely reproducible. A further method provides that a further composition result, which is limited in its functionality, does not contain the cryptological component and does not need to receive data from the cryptological function in order to ensure the correct mode of function. This method is suited for the distribution of test versions of software, which can be freely copied and distributed. The composition result has to be limited in its functionality, so that an aggressor cannot replace the composition result coupled to the cryptological function in the full version by the composition result used in the test version, and thus produce a full version without limitations.

With the aid of an alternative method, it is achieved that the execution of a data-processing net or program, respectively, is coupled to the executing device. A cryptological function, which is executed in a protected way, e.g. a function of the TPM-chip of the Trusted Computing Platform Alliance (TCPA) [13], which is fixedly attached to the device, a PC or a PDA for instance, exchanges data with the net or the program, respectively. The data-processing net or the program, respectively, do not work or work erroneously when no or erroneous data are received from the cryptological function. In one form of realisation of the method, a value exceeding a calculation of the function value of the cryptological function is stored in a fashion which makes it not readable or changeable for an aggressor, and in a following calculation of a further function value, this value influences the result of the following calculation, wherein this value changes according to a predetermined rule. Through this, it is prevented that plural net instances or program instances, respectively, can use uncontrolled function values of the cryptological function.

BRIEF DESCRIPTION OF THE DRAWINGS

FIG. 10 shows the natural number 2 is represented by a machine which outputs the binary system string 010 on channel a;
FIG. 29(a) shows a possible structure of a register database;
FIG. 29(b) shows another possible structure of a register database.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
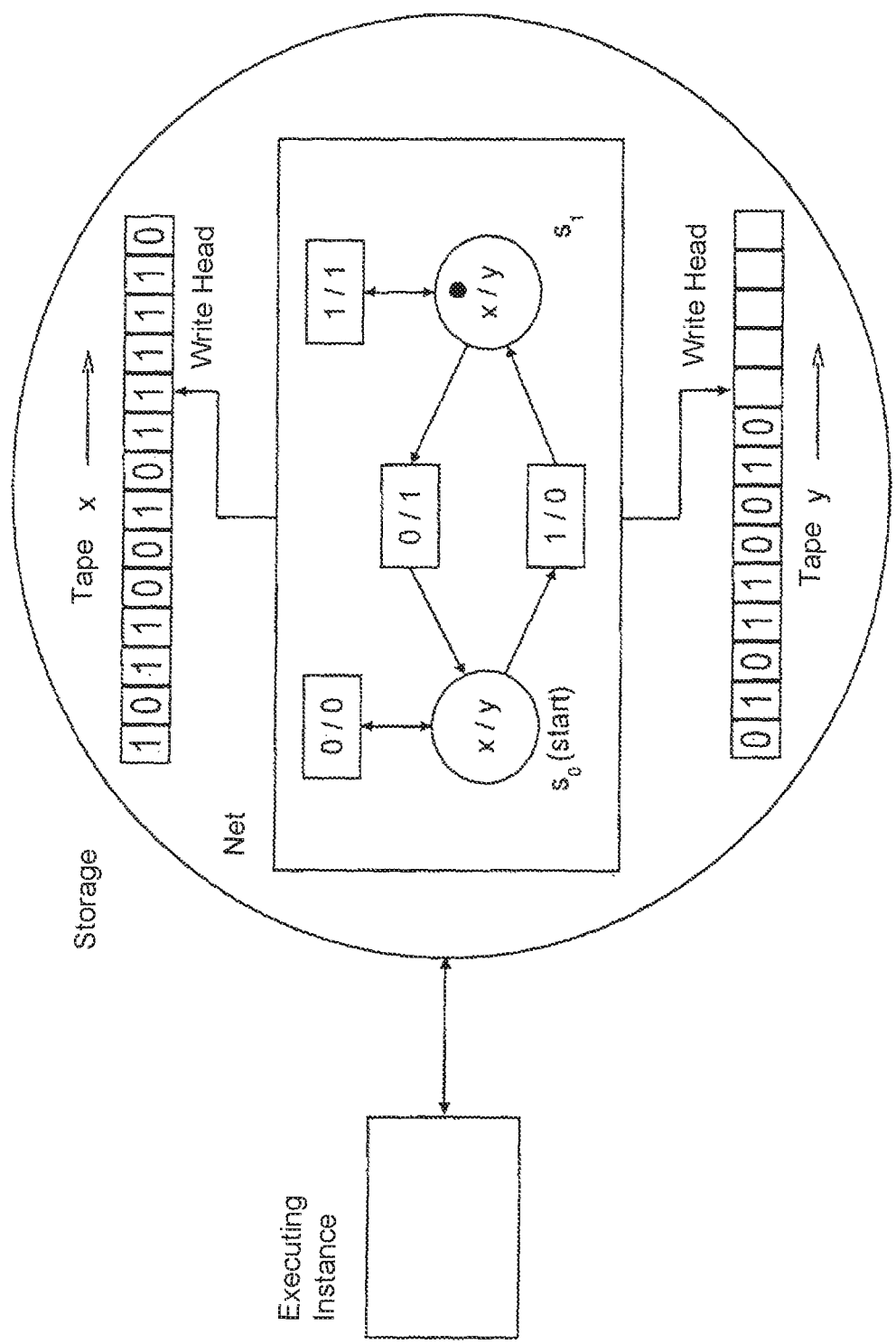
FIG. 1 shows an executing instance.

In FIG. 1, an executing instance has access to a memory, which stores a Petri net and the tapes x and y. The starting mark has a marker on a position, the starting state $s_0$. With every switching of a transition, the marker is moved from the starting position to the exit position, a symbol of the input alphabet is read from the tape x with the aid of a head and a symbol of the output alphabet is written on tape y with the aid of a further head. After every reading and writing operation, the heads move one field towards the right side. The net executes a binary multiplication [y=2x].

In all following figures, the representation of the executing instance, the memory, the tapes and the heads is omitted. Instead of the term "Petri net", the term "net" is used.

Figure 2:
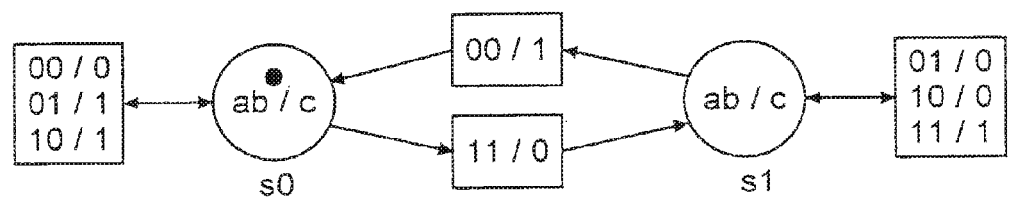
FIG. 2 shows a binary addition.

FIG. 2 shows a binary addition. A marker is on the starting state $s_0$. The transitions bear the legend of the form ab/c. The input and output channels are indicated in the same form at the entrance position of every transition. a and b are the channels for operands, c is the channel for the result. Transitions which have the same entrance position and the same exit position, but have different inputs or outputs, are represented by one rectangle in this and many further representations. Each row of a rectangle corresponds to one transition.

Figure 3:
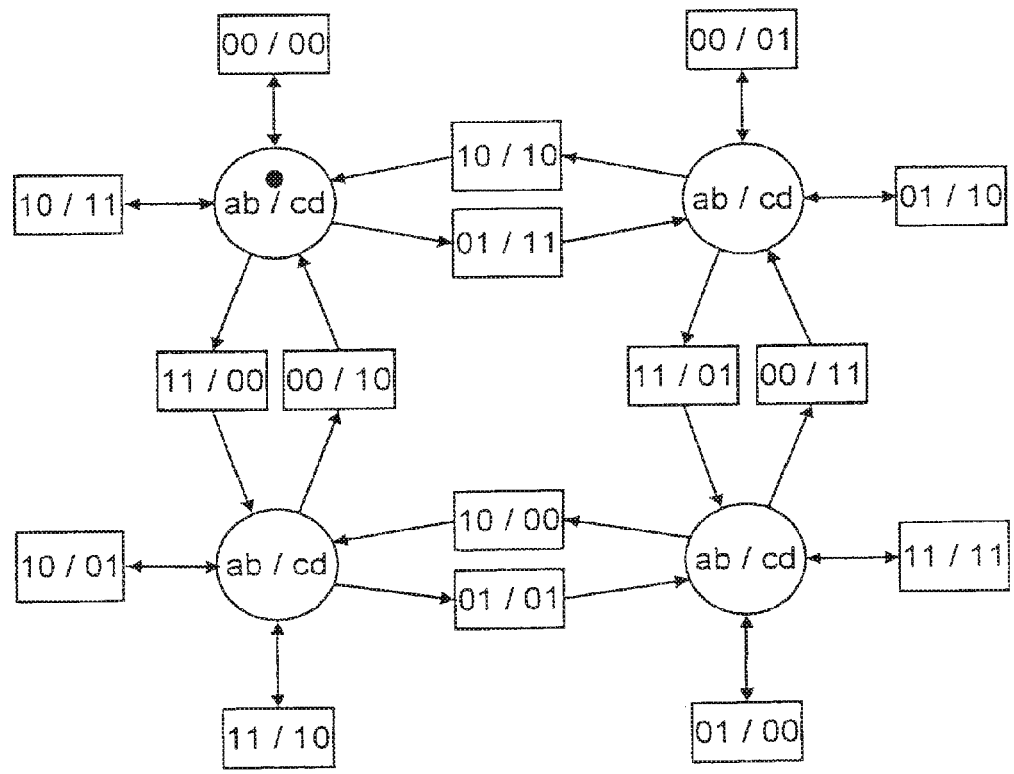
FIG. 3 shows a net which has plural input channels and plural output channels.

There are cases in which plural results of a processing are to be calculated and outputted in parallel. FIG. 3 shows a net which has, besides to plural input channels, plural output channels too, and which sums up two binary-represented, natural numbers: [c=a+b, d=a−b].

Figure 4:
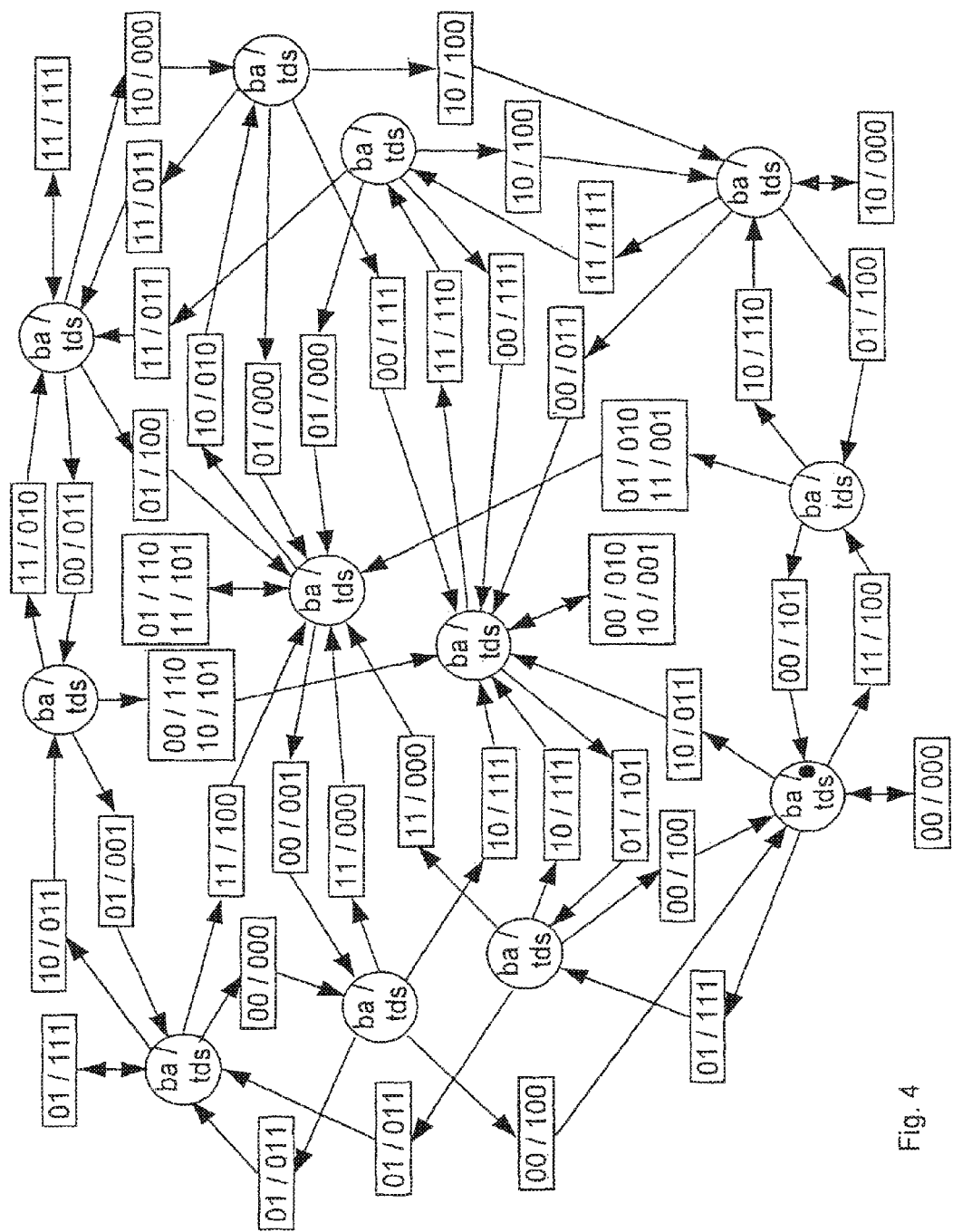
FIG. 4 shows another example of a net.
Figure 5:
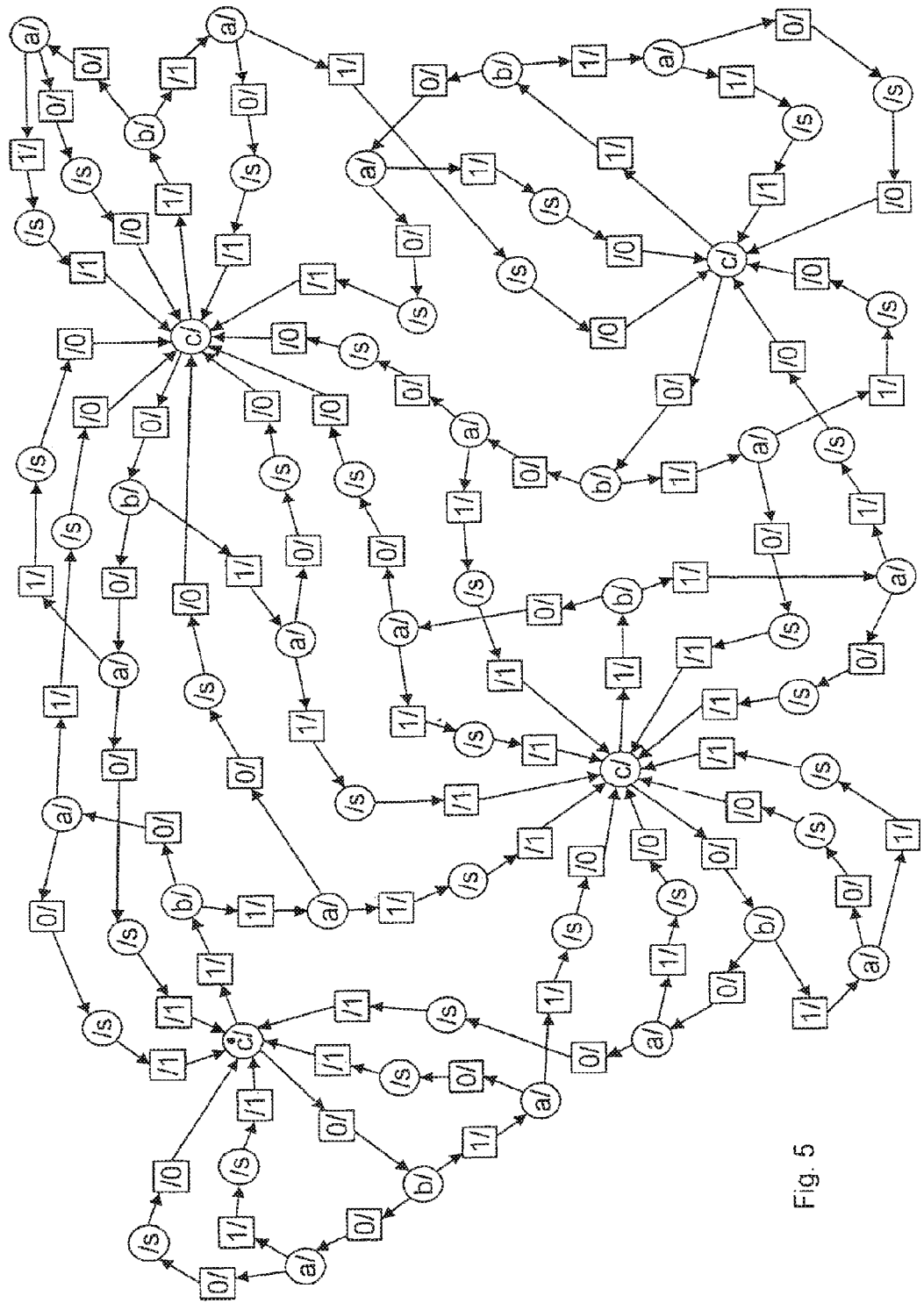
FIG. 5 shows another example of a net.

Further examples of nets are represented in FIGS. 4 and 5. The net in FIG. 4 calculates [t=3·a, d=a−b, s=a+b], the net in FIG. 5 calculates [s=a+b+c].

Figure 6:
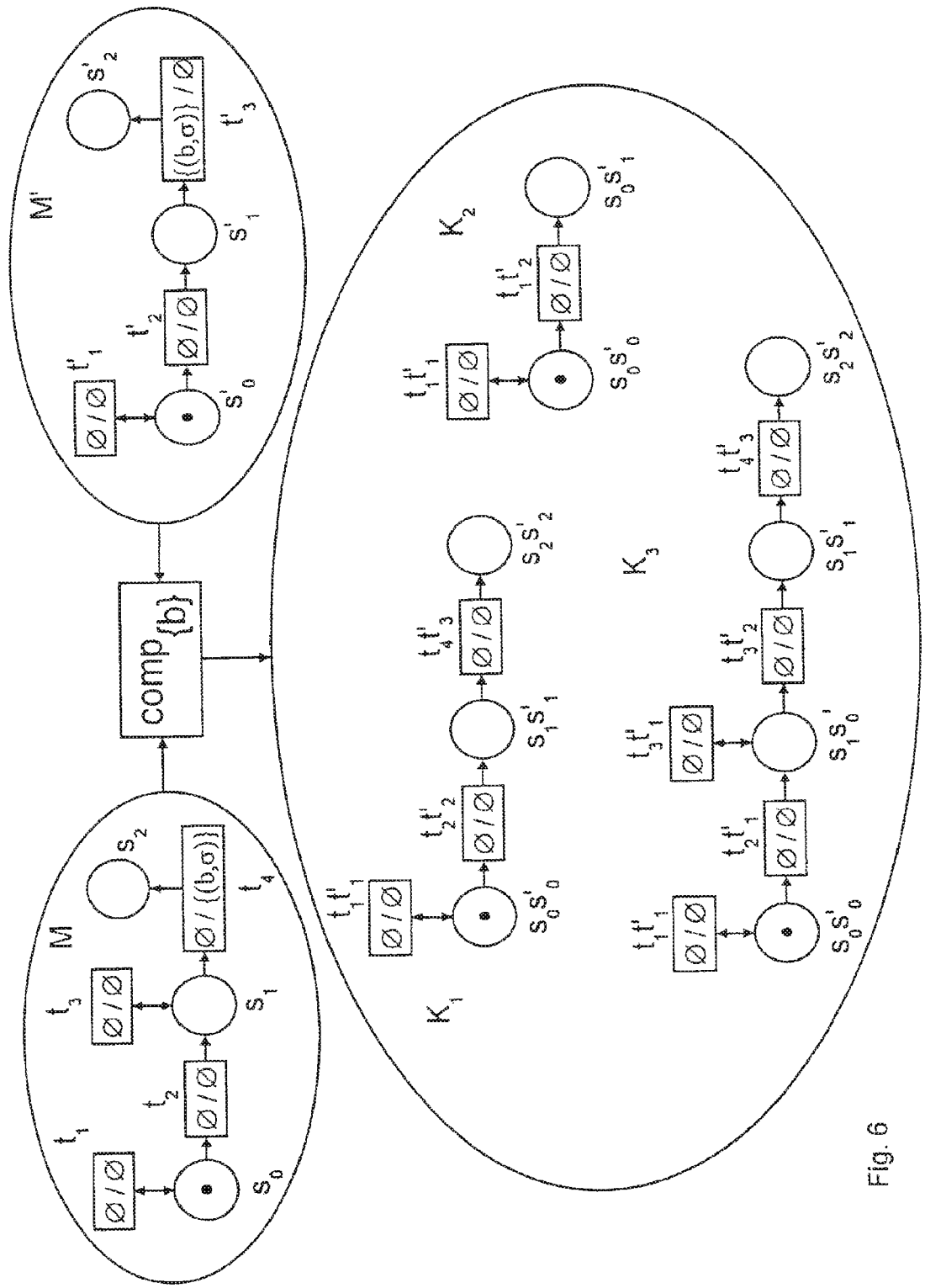
FIG. 6 shows the composition of two nets M and M'.

FIG. 6 shows the composition of two nets M and M'. The input- and output events are described in the transitions by sets like those in claim 11. M writes with the transition $t_4$ via channel b the symbol σ, which M' reads via the same channel with transition $t'_3$. b is an internal synchronisation channel. $t_4$ and $t'_3$ are the only transitions which work on channel b and can therefore switch in synchronism only. There are the composition results $K_1$, $K_2$ and $K_3$. No compatible transitions lead further from the positions $s_0$ and $s_1$. Therefore, the described composition routine ends after entering the state $(s_0, s_1)$ into the list of the composed states.

Figure 7:
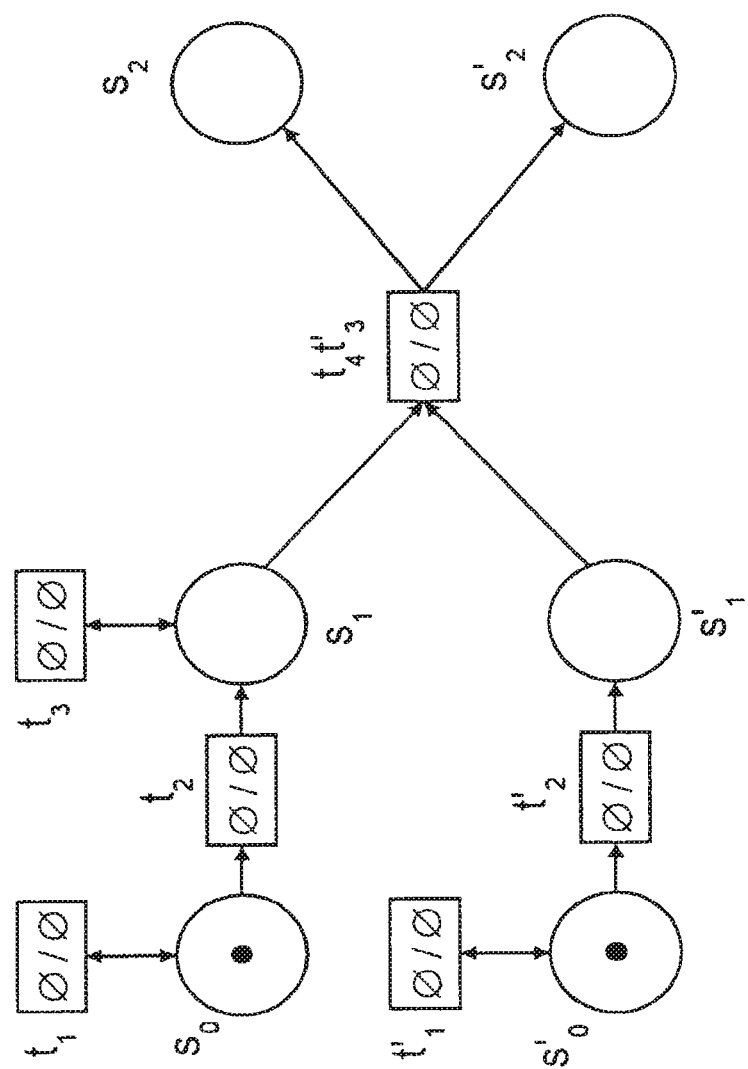
FIG. 7 shows the composition of the nets of FIG. 6, in which only transitions with synchronization channels are combined into a transition.

FIG. 7 shows the composition of the same nets in which only transitions with synchronization channels are combined into a transition, in order to get the information about the by-passing.

Figure 8:
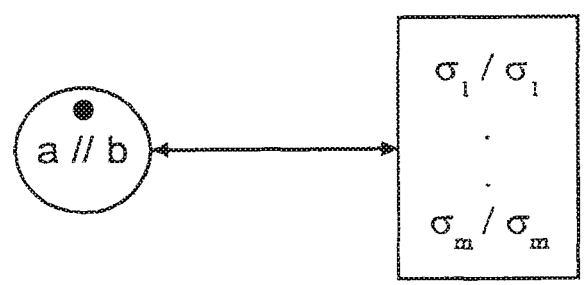
FIG. 8 shows a machine representation, wherein a or b is an internal synchronization channel.

If it is desired to replace in a machine an output channel a by a channel b, or an input channel b by a channel a, respectively, M is composed with the machine represented in FIG. 8, wherein a or b, respectively, is an internal synchronisation channel. $\{σ_1, \ldots, σ_m\}$ is the set of symbols assigned to the channels a and b.

Figure 9:
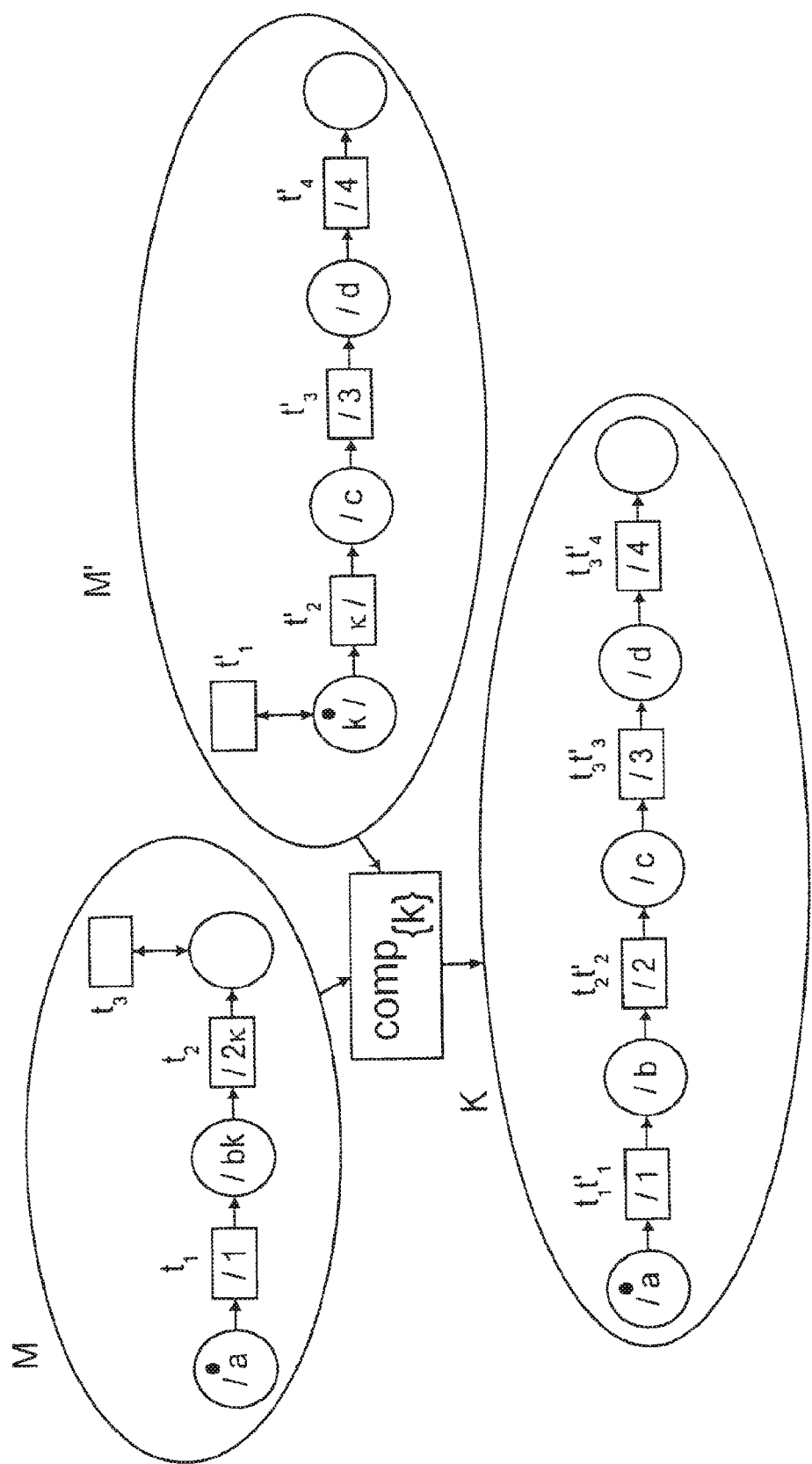
FIG. 9 shows that concatenation of nets can also be performed by a composition.

FIG. 9 shows that concatenation of nets can also be performed by a composition. Transitions with empty sets of events ("empty transitions") the entrance position of which is like the exit position, are designated waiting transitions in the following, and are represented by empty rectangles in FIG. 9. M writes a 1 on channel a and then a 2 on channel b. M' writes a 3 on channel c and then a 4 on channel d. M and M', respectively, have in addition a channel k for concatenation and waiting transitions $t_3$ or $t'_1$, respectively. In transition $t_2$ of M, the symbol κ is written on channel k. Transition $t'_2$ of M' reads the symbol κ on channel k. If M and M' are composed with k as the internal synchronisation channel, one receives the machine K, which writes consecutively on channels a, b, c, and d, respectively, a 1, 2, 3, and 4. If machines are desired to be apt to concatenation, the surroundings of the starting and ending states have to be prepared in a corresponding way. Channels for concatenation can be assigned to different transitions. The concatenations can be influenced by suitable substitution of channels.

Figure 10:
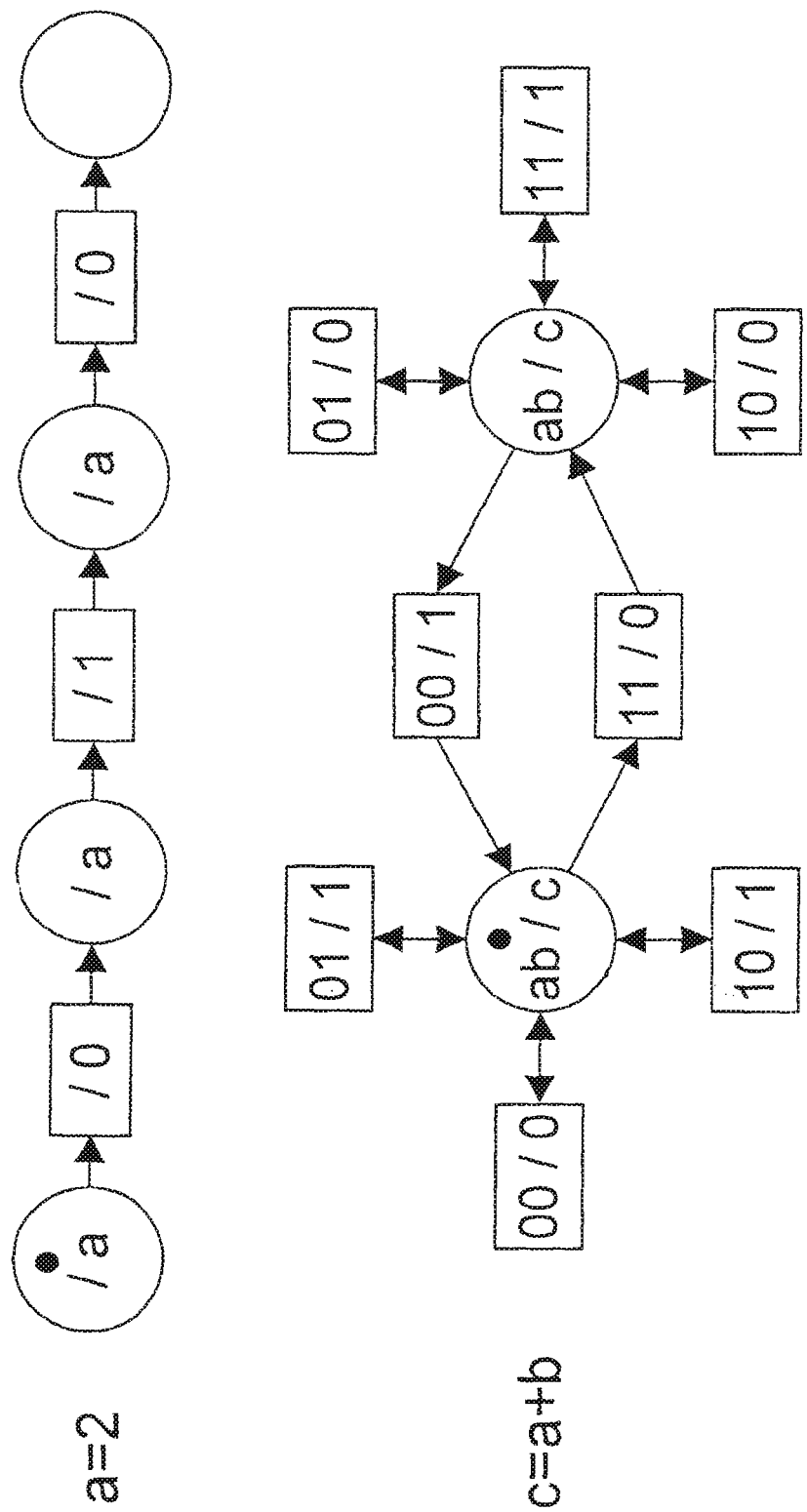
Figure 11:
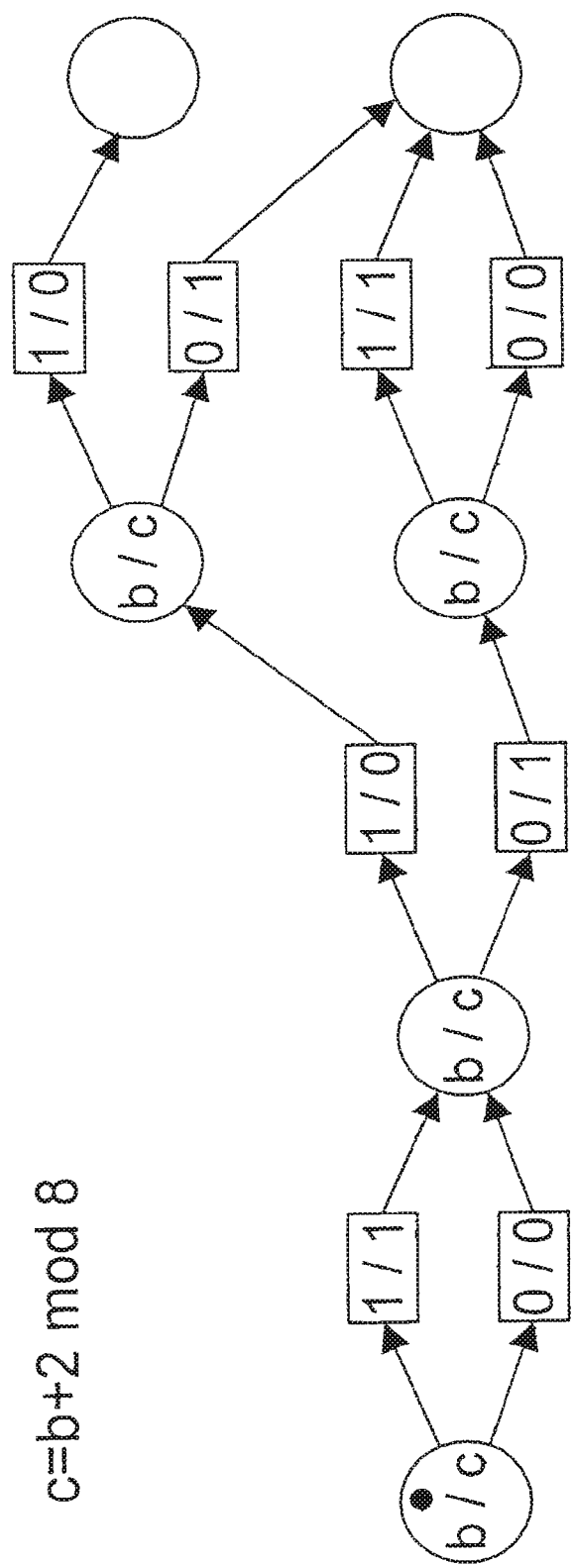
FIG. 11 Shows the results of an equation c=b+2 mod 8.

In FIG. 10, the natural number 2 is represented by a machine which outputs the binary symbol string 010 on channel a. This corresponds to the equation a=2. A machine for the addition c=a+b reads on channel a and b and writes on channel c. Both machines are composed via the internal synchronisation channel a. FIG. 11 represents the result.

$$[c=b+2 \bmod 8]=\text{comp}_{\{a\}}([c=a+b],[a=2])$$

Figure 12:
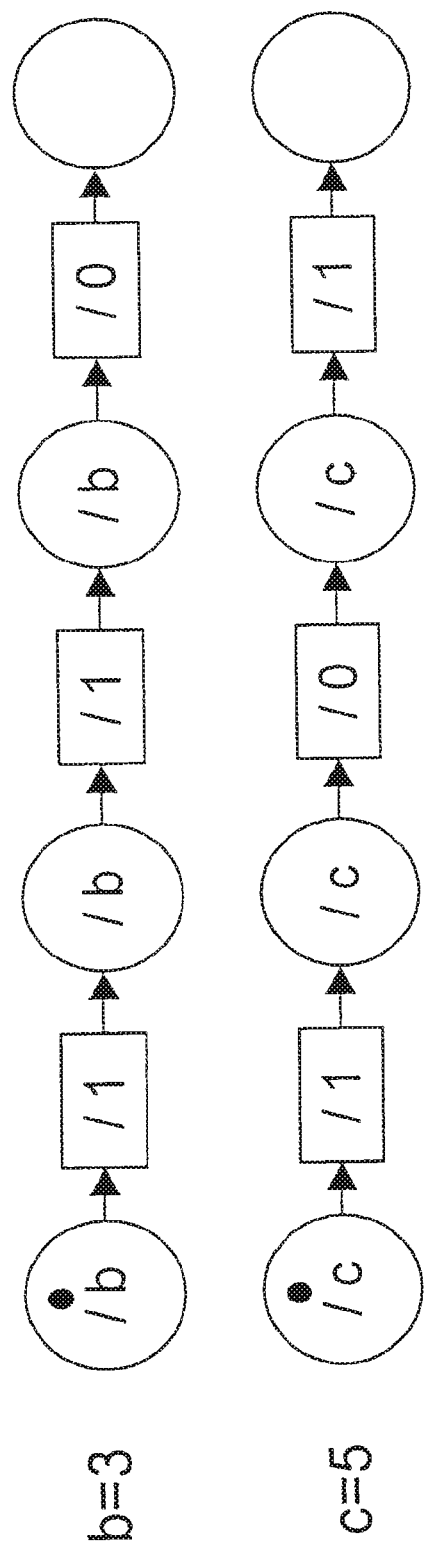
FIG. 12 shows b=3 and c=5.

The composition algorithm breaks off, because it does not find any more transition in the end state of a=2. The composition result can only output symbol strings of length 3, expressed by mod 8. If c=b+2 mod 8 is composed with the machine b=3 from FIG. 12 via the internal synchronisation channel b, one receives the machine c=5, also represented in FIG. 12.

$$[c=5]=\text{comp}_{\{b\}}([c=b+2 \bmod 8],[b=3])$$

Figure 13:
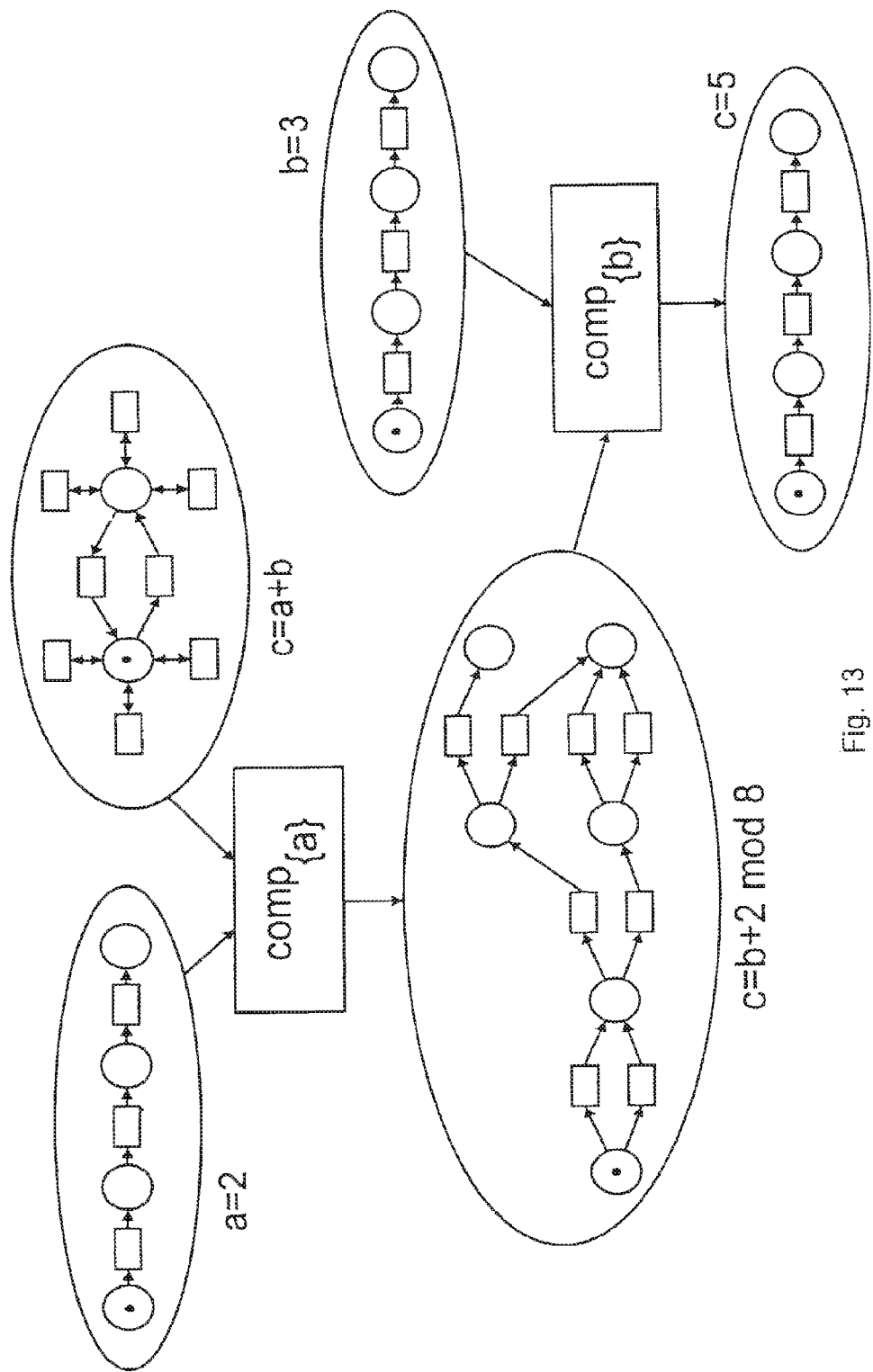
FIG. 13 shows the complete operation.

FIG. 13 represents the complete operation. The result of the compositions c=5 is received without the intermediate result c=b+2 mod 8 by composing all components in one single step.

$$[c=5]=\text{comp}_{\{a,b\}}([c=a+b],[a=2],[b=3])$$

Figure 14:
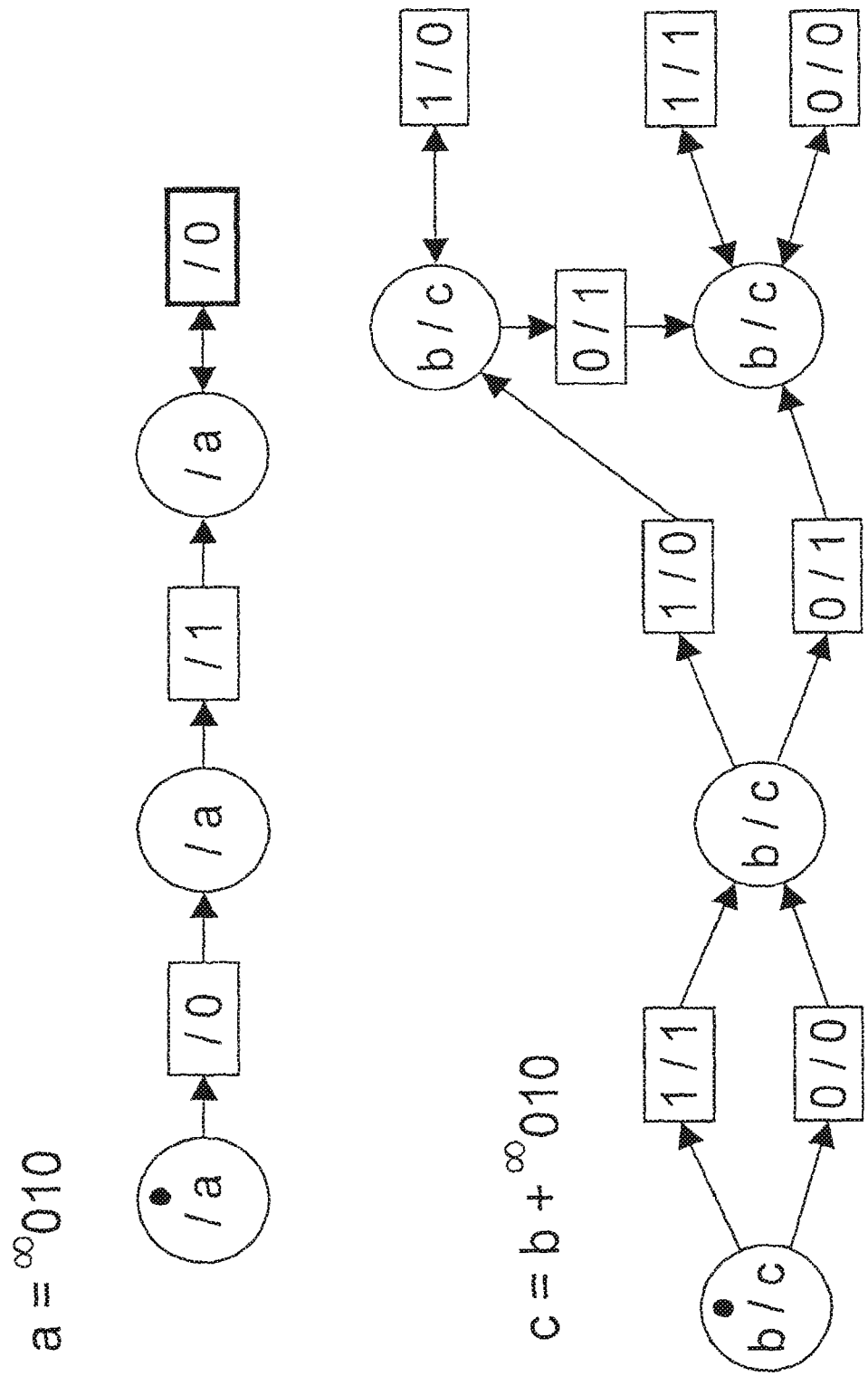
FIG. 14 shows a=2, represented with infinite leading zeroes.

The machine c=a+b can process infinitely long symbol strings. The composition result after composition with one operand can do this also, when the operand is closed by a cyclic transition which outputs zeroes. In FIG. 14, a=2 is represented binary with leading zeroes. The composition result after composition with c=a+b can process infinitely long symbol strings, as is also represented in FIG. 14.

$$[c=b+{}^\infty 010]=\text{comp}_{\{a\}}([c=a+b],[a={}^\infty 010])$$

Figure 15:
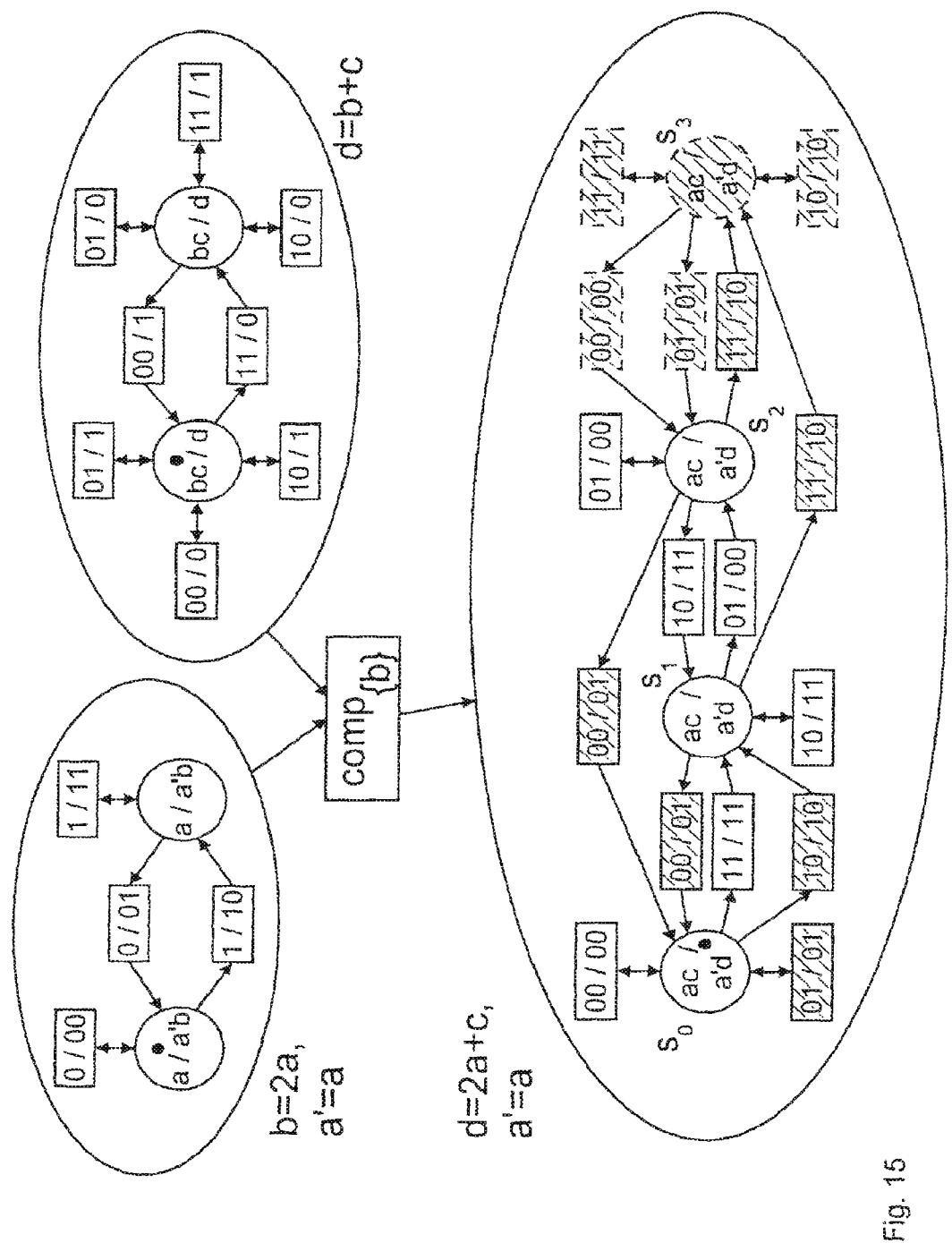
FIG. 15 shows the first step of simplifying a=2a+c.
Figure 16:
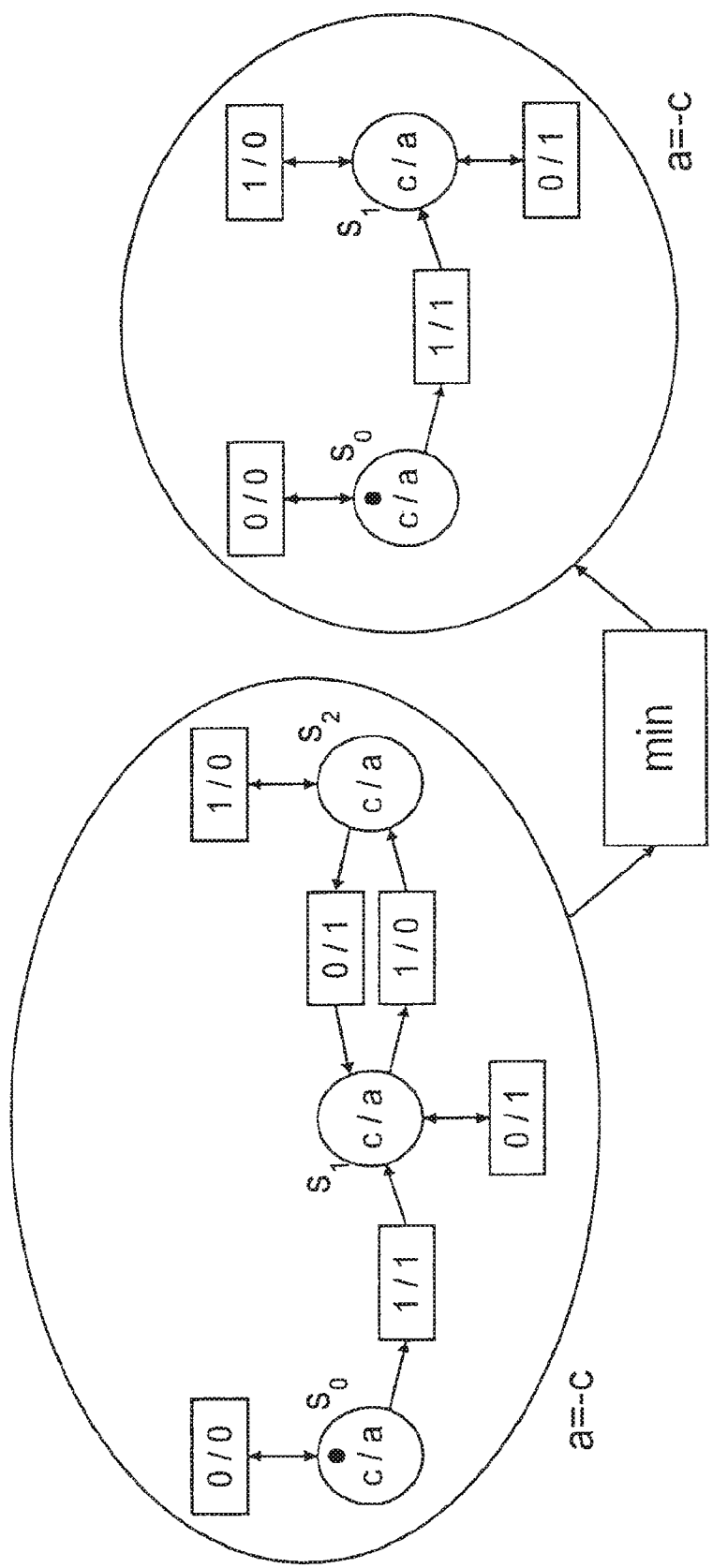
FIG. 16 shows another step.
Figure 17:
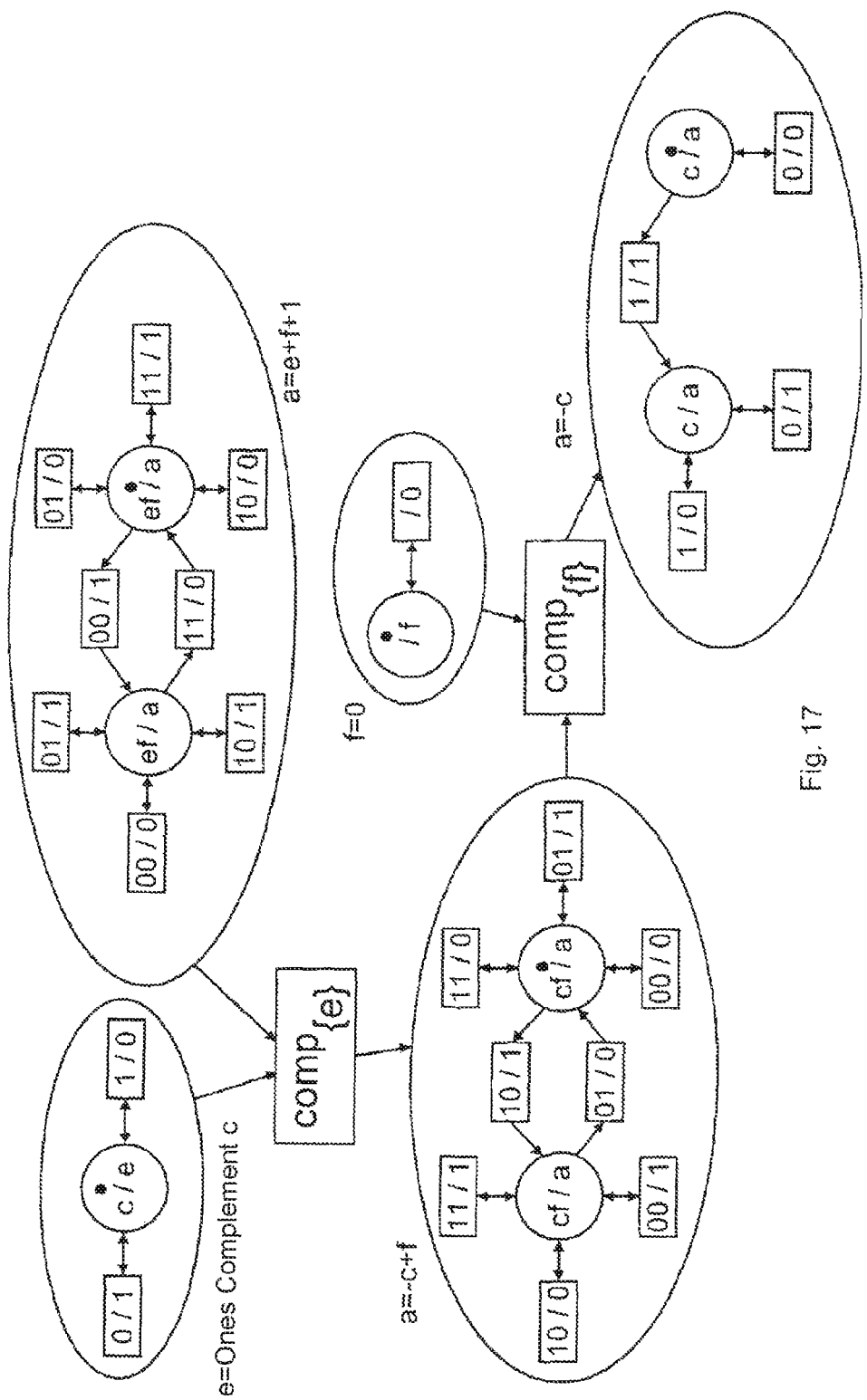
FIG. 17 shows a verification step.

In a further example, the equation a=2a+c is to be simplified. In order to be able to process it, it is encoded as a net. For this purpose, the equation d=2a+c is created first and thereafter d is substituted by a. FIG. 15 represents the first step. When d is now substituted by a, all those transitions are invalid in which the symbols assigned to the channels a and d had been unequal before the substitution. The invalid transitions and a no more accessible position $s_3$ are shadowed grey in FIG. 15. After the substitution, the channel a has to be removed, because it can not be read and written on one channel at the same time in one transition. In order not to loose the information of channel a after the removal, the copy a'=a has been made. FIG. 16 represents the result of these steps at the entrance position of the transition min. It can be demonstrated that $s_1$ and $s_2$ are equivalent. After the minimizing through min, the result is the equation a=−c. This can be verified as is represented in FIG. 17. If in a binary-working, sequential machine a=e+f the transmitted state is defined as the starting state, one receives the machine or net, respectively, a=e+f+1. Thereafter, e is replaced by the one-complement of c, so that a=−c+f After f=0 there is a=−c.

Figure 18:
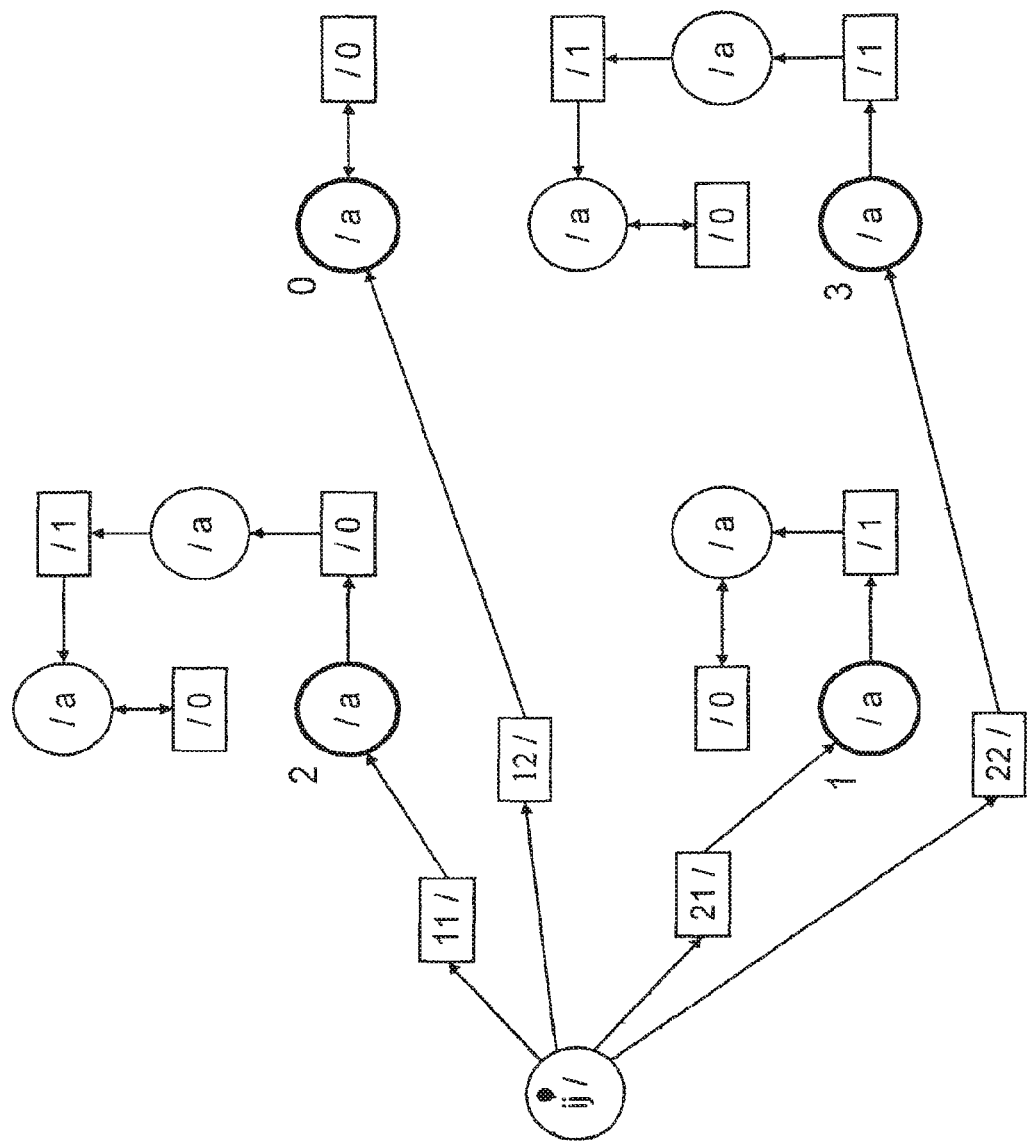
FIG. 18 shows matrices of natural numbers encoded as nets and summed up through composition.
Figure 19:
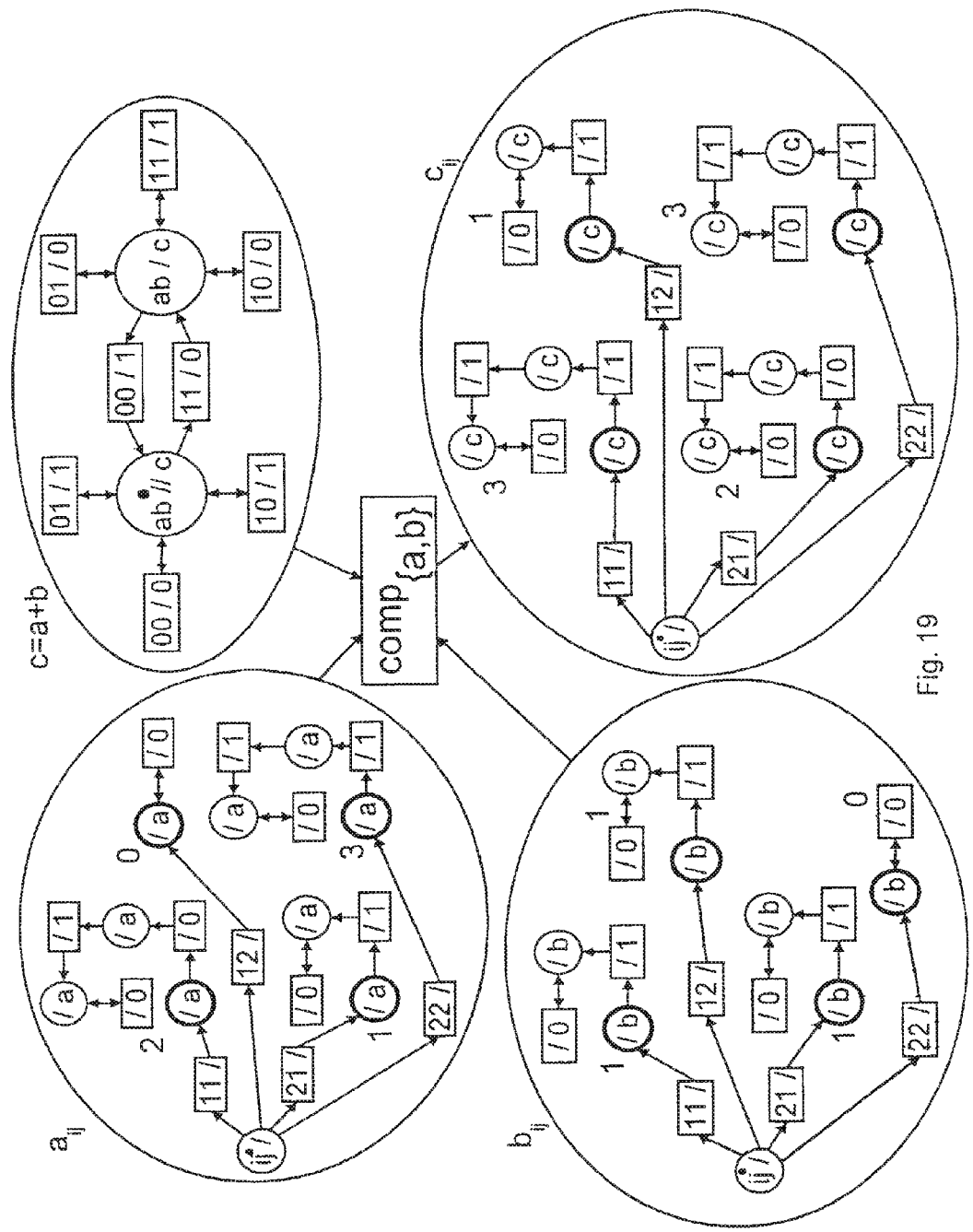
FIG. 19 shows a representation of a composition.

In the following, matrices of natural numbers are encoded as nets and summed up through composition. The net from FIG. 18 corresponds to a function of $\{1, 2\}^2$ to $\{0, 1, 2, 3\}$ which gives the row i and the column j of the matrix $$A = \begin{pmatrix} 2 & 0 \\ 1 & 3 \end{pmatrix}$$

wherein the function values {0, 1, 2, 3} are binary encoded as {$^\infty 0$, $^\infty 01$, $^\infty 010$, $^\infty 011$}. First, the net reads the row- and column index and then it outputs the corresponding matrix element. The designation of the channels for entering the indices plays a role in the co-operation with other nets. For this reason, the indices are added to the matrix designator in the following, in difference to conventional ways for writing matrices: $A_{ij}$. The composition yields $$\left[c_{ij} = \begin{pmatrix} 3 & 1 \\ 2 & 3 \end{pmatrix}\right] = \text{comp}_{\{a,b\}}\left([c = a+b], \left[a_{ij} = \begin{pmatrix} 2 & 0 \\ 1 & 3 \end{pmatrix}\right], \left[b_{ij} = \begin{pmatrix} 1 & 1 \\ 1 & 0 \end{pmatrix}\right]\right),$$

which is represented in FIG. 19. Waiting transitions are symbolised by the character string '//' in the entrance position (the starting position) The starting state of c=a+b has a waiting transition. The channels i and j become external synchronisation channels. They remain maintained in the composition result, whereas the internal synchronisation channels a and b are not maintained. c is not a synchronisation channel.

Figure 20:
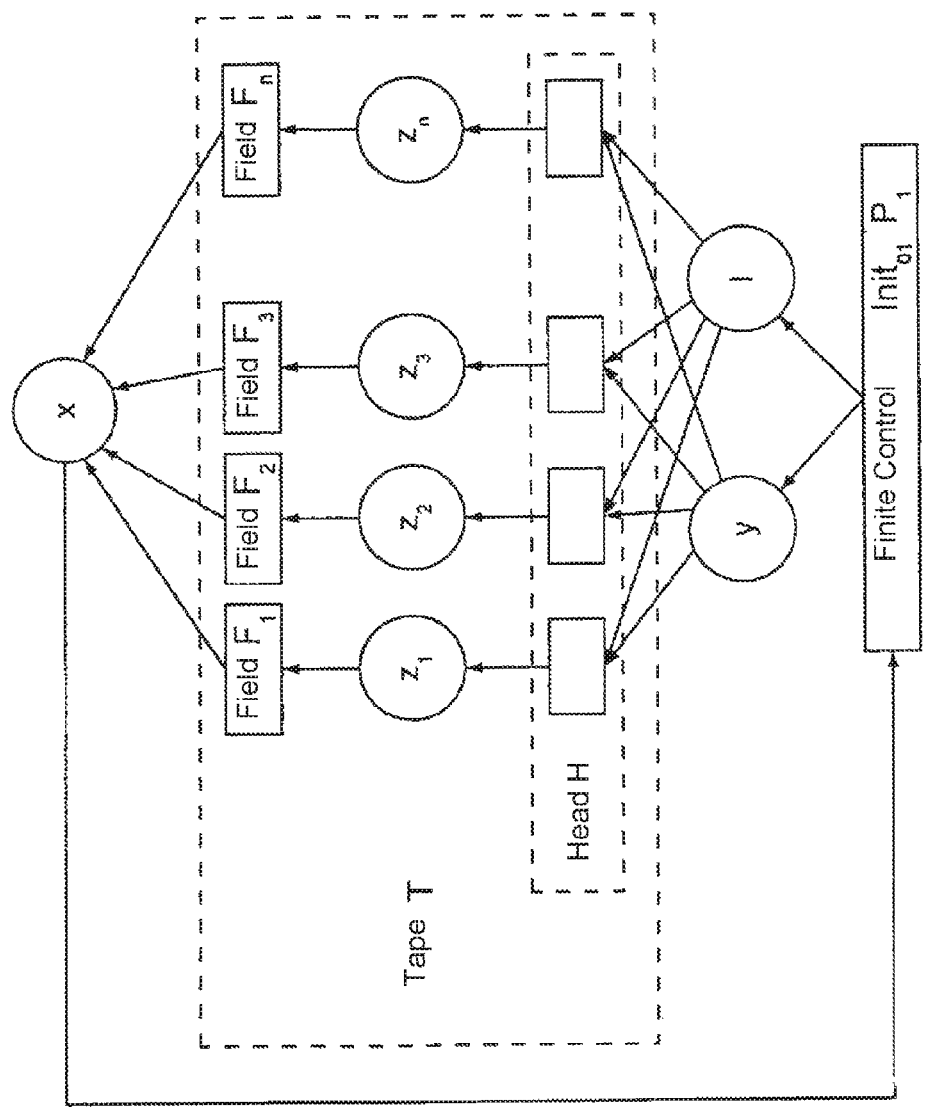
FIG. 20 shows the channel structure of a Turning machine.
Figure 21:
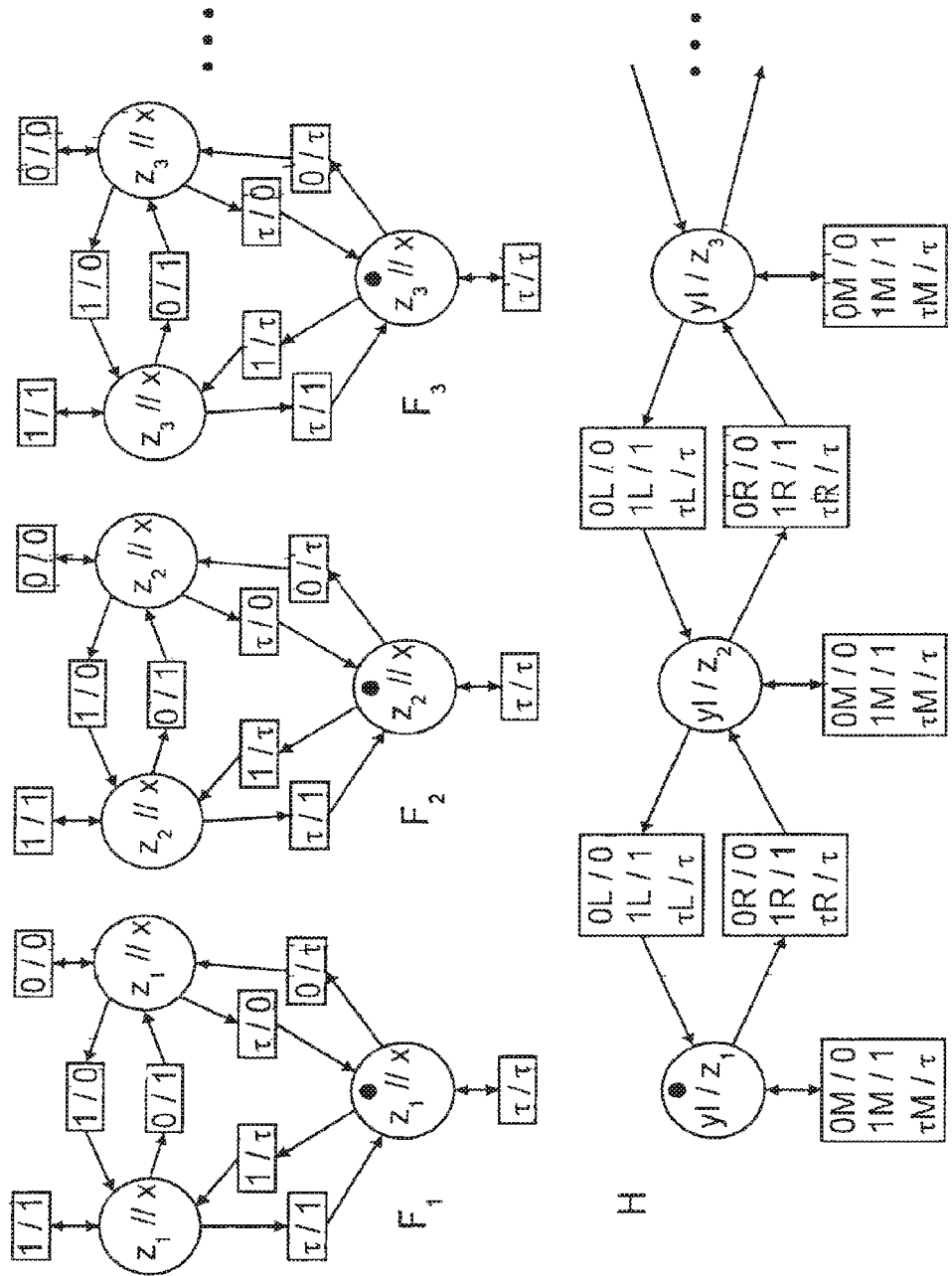
FIG. 21 shows a tape with fields for memorizing the symbols 0, 1 and τ.
Figure 22:
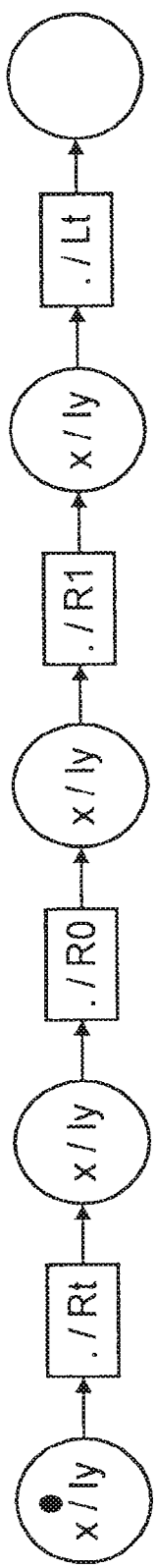
FIG. 22 shows an initialization $Init_{01}$ of the tape with the symbol string $τ_{01}τ$.

FIG. 20 shows the channel structure of a Turing machine, which is formed by a co-operation of nets. The transitions correspond to the involved co-operation partners, the positions correspond to the channels. A finite control, realised as a net, reads symbols via channel x and writes symbols via channel y on a tape, respectively. Via channel I, the finite control gives movement instructions to the head at every reading and writing process. A head H with fields F, communicates via channels $z_i$. FIG. 21 shows a tape with fields for memorising the symbols 0, 1 and τ. In the beginning, all the fields memorise the symbol τ. In FIG. 22, an initialisation $\text{Init}_{01}$ of the tape with the symbol string τ01τ is represented. A point instead of a symbol in a transition means that every permitted symbol may be inserted here. The transition rectangle with the legend "./R τ" and the starting position with the legend "x/Iy" is the shortcut for three transitions with the same entrance and exit position with the following sets of input/output events: 1. transition: {(x, 0)}/{(I, R), (y, τ)}, 2. transition: {(x, 1)}/{(I, R), (y, τ)}, 3. transition: {(x, τ)}/{(I, R), (y, τ)}. If the initialisation $\text{Init}_{01}$ with the head H and four tape fields $F_1, \ldots, F_4$ is composed, the internal synchronisation channels being x, y, I, $z_1 \ldots z_4$, departing from the starting states of all the components, there is only one set of compatible transitions in the first composition step, as is represented in Table 1:

TABLE 1

| Compatible transitions | | |
| --- | --- | --- |
| Component | Channels | Symbols |
| Initialisation P | x/Iy | τ/Rτ |
| Head H | yI/$z_1$ | τR/τ |
| Field $F_1$ | $z_1$/x | τ/τ |
| Fields $F_2$, $F_3$, $F_4$ | (Waiting transitions) | — |

Figure 23:
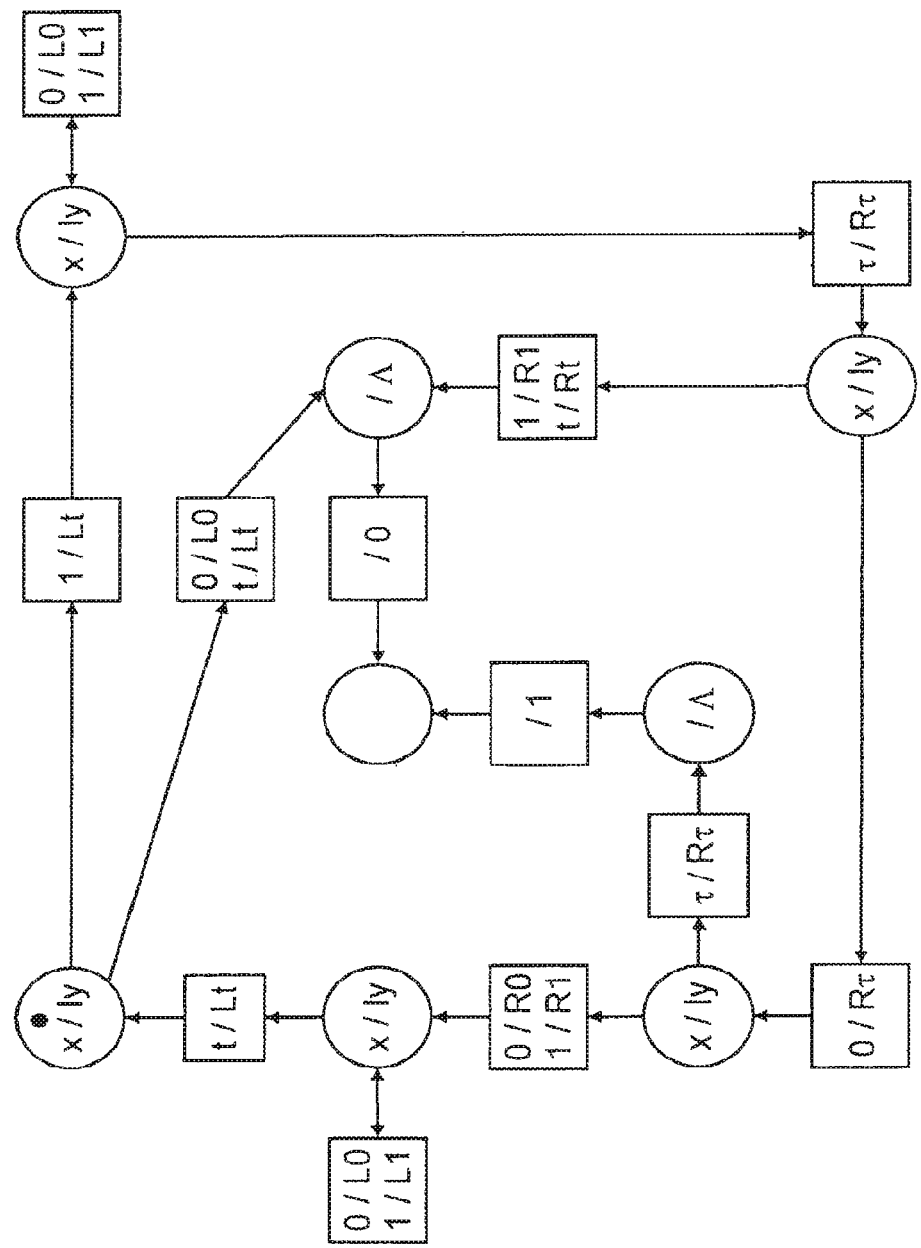
FIG. 23 shows a finite control $P_1$.
Figure 24:
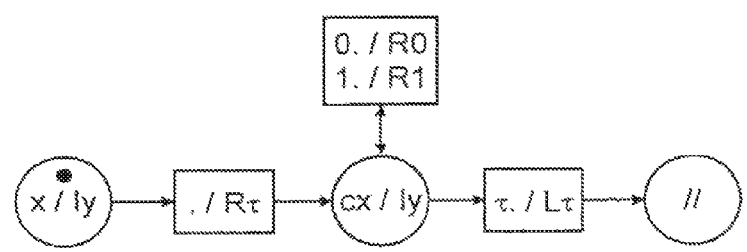
FIG. 24 shows knowledge encapsulated by a machine.
Figure 25:
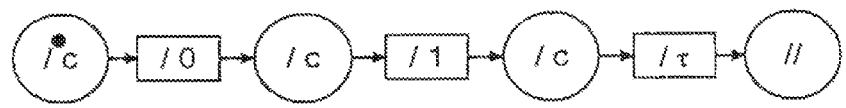
FIG. 25 shows symbol strings.
Figure 26A:
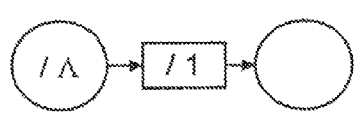
FIG. 26(a) shows a machine with c∈L.
Figure 26B:
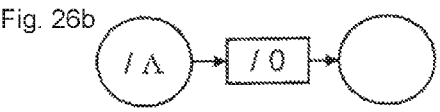
FIG. 26(b) shows a machine with c∉L.

The components form a closed circuit of symbol producers and symbol consumers. After the composition, the head is positioned on field $F_3$, which memorises a one. A finite control $P_1$ for recognising the language L={$0^n$ $1^n$|n≥1} is represented in FIG. 23. It is presupposed that the word which is to be recognised stands flush left on the tape with a foregoing and a following τ, and that the head is positioned on a field on the left of the τ at the right side. Supposed the word belongs to language L, there is the following procedure (similar to that in [5]): The one standing farthest at right is replaced by τ. Thereafter, the head moves towards the left side up to the next τ, and then one field to the right side. The zero standing farthest at left is memorised here, and is replaced by τ. Thereafter, the one standing farthest at the right and then the zero standing farthest on the left is replaced by τ, and so forth. In the case that a zero was replaced by τ and a τ was found next to it on the right side, the machine accepts the word. The accepting is communicated to the outer world by writing a one on the channel Λ. If the machine, when seeking for a zero or a one, respectively, finds a one or a zero, respectively, or a τ, the word is not accepted and a zero is outputted on channel Λ. The user (the finite control of the tape in this case) does not need to have any knowledge about the structure of the tape. The band and the fields might also be composed in one machine, for instance. The user must only have knowledge about the meaning of the input and output channels, via the interface of the tape. A user of the finite control for recognising the language has to know how the word that is to be examined must be written on the tape. To this belongs the knowledge about the meaning of channel I and the convention to write a foregoing T on the first field of the tape. This knowledge may be encapsulated by the machine in FIG. 24. When this encapsulation is composed with the tape, symbol strings in the form as shown in FIG. 25 can be inputted. Let be c∈L. When E is concatenated with $P_1$ (ending state of E is the starting state of $P_1$) and this is composed with T, all channels used by at least two machines being synchronisation channels, one gets a machine after applying red which is represented in FIG. 26a). When c∈L, the result is the machine represented in FIG. 26b).

$$c \in L \wedge |c|=n \Leftrightarrow [\Lambda=1]=\text{red } (\text{comp}_{\{c,x,y,I,z_1,\ldots z_{n+2}\}}(c,E,P_1,T)).$$

Figure 27B:
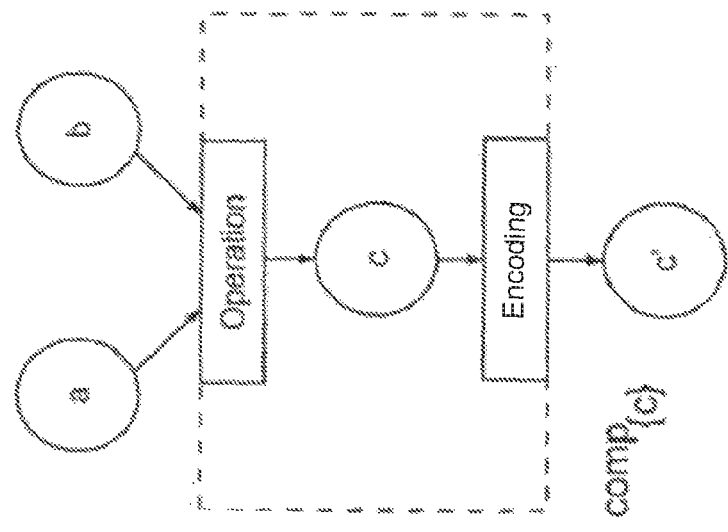
FIG. 27(b) shows how uncoded operands a and b are processed.
Figure 27A:
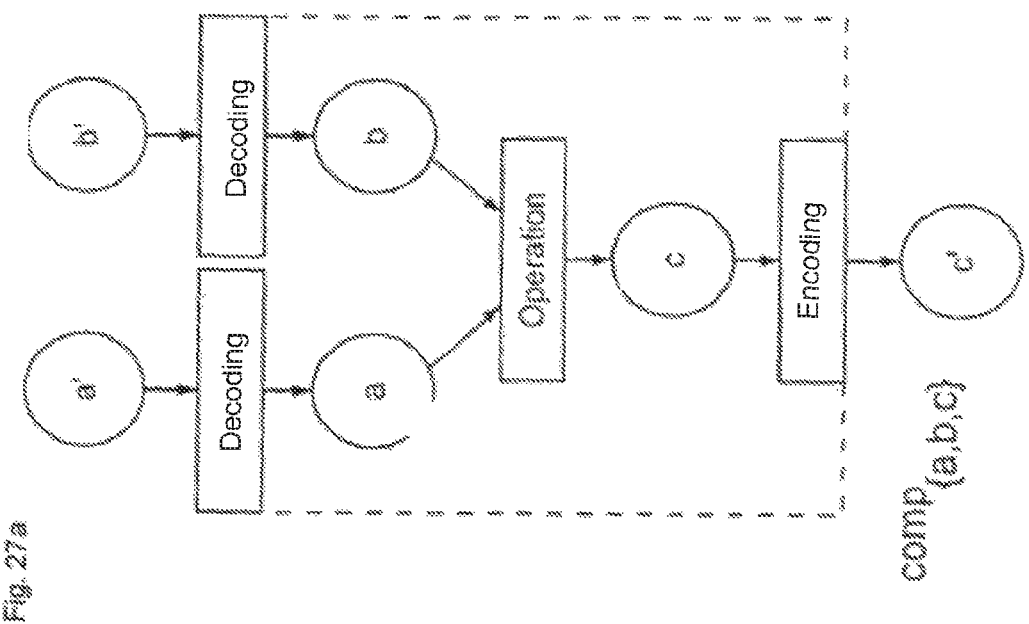
FIG. 27(a) shows the encoded execution of an operation.

FIG. 27a) shows the encoded execution of an operation. The operands a, b and c, respectively, are encoded as a', b' and c', respectively. The decodings of a and b and the encoding of c are composed with the operation. FIG. 27b) shows how uncoded operands a and b are processed with an operation and the result c is encoded as c'. The operation and the encoding are composed.

Figure 28B:
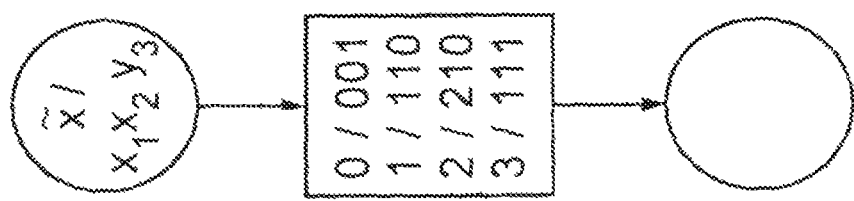
FIG. 28(b) represents an inversion of FIG. 28(a) inversion.
Figure 28A:
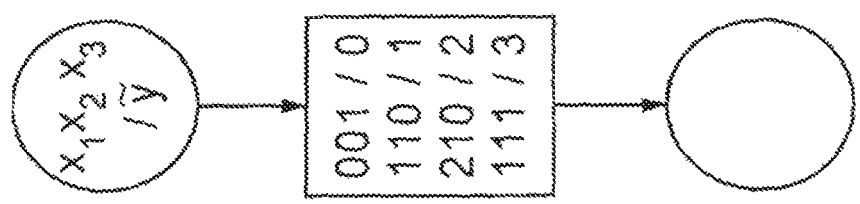
FIG. 28(a) represents a combiner of channels.

FIG. 28a) represents a combiner of channels and its inversion, a separator, respectively, which is used in a register database. In FIG. 29a), a possible structure of a register database is shown. In order to change a register value, plural operations are combined. Via channel x', a register database R' with three registers $R_1$, $R_2$ and $R_3$ is read. The old register value of register $R_3$ is outputted on channel $x_3$. Via channel $y_3$, a new value is written into the register $R_3$. FIG. 29b) shows a composition which outputs the content of register $R_3$ without changing the register database.

Figure 30:
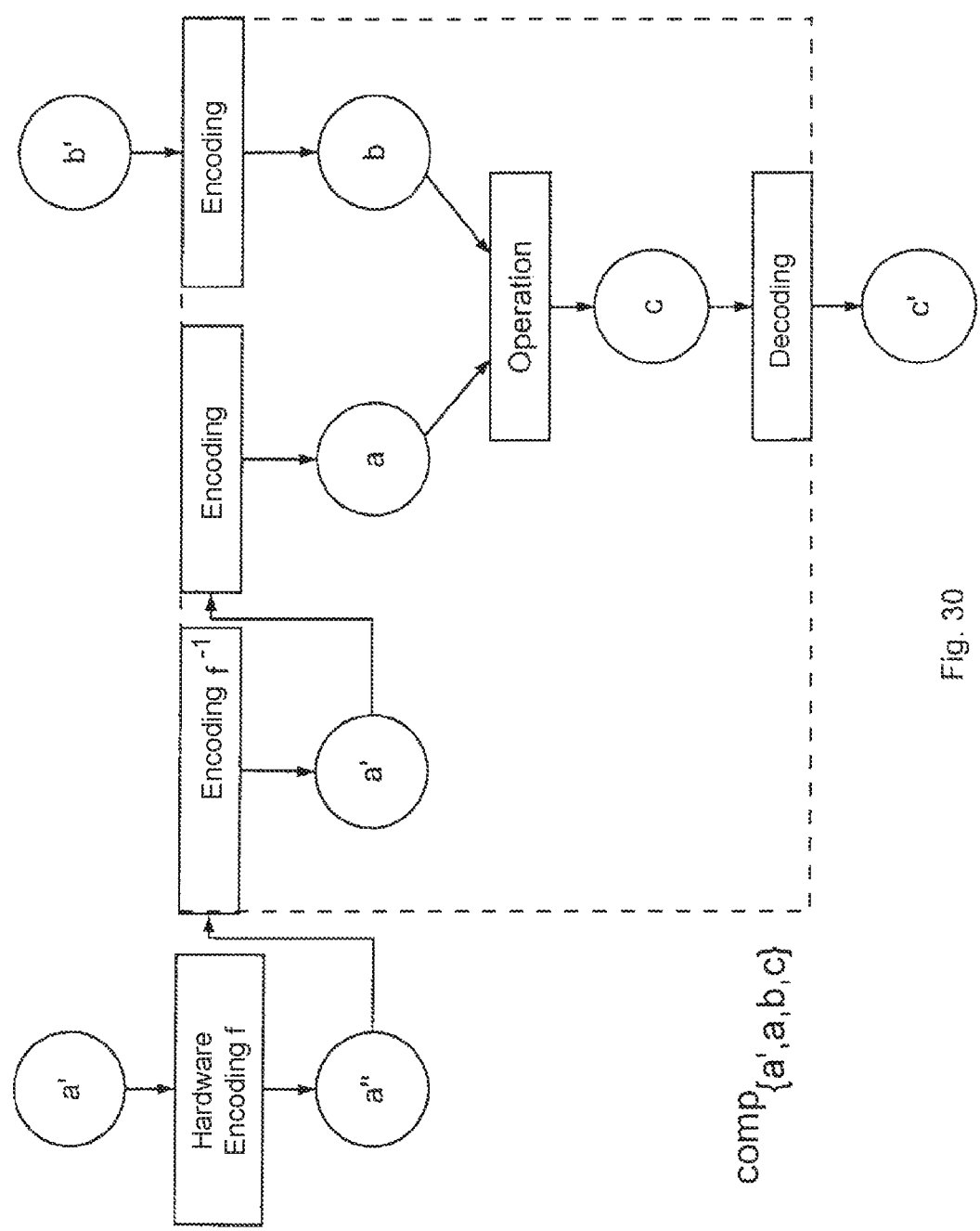
FIG. 30 is a representation of how a hardware encodes data of the application with a stream encoding.
Figure 31:
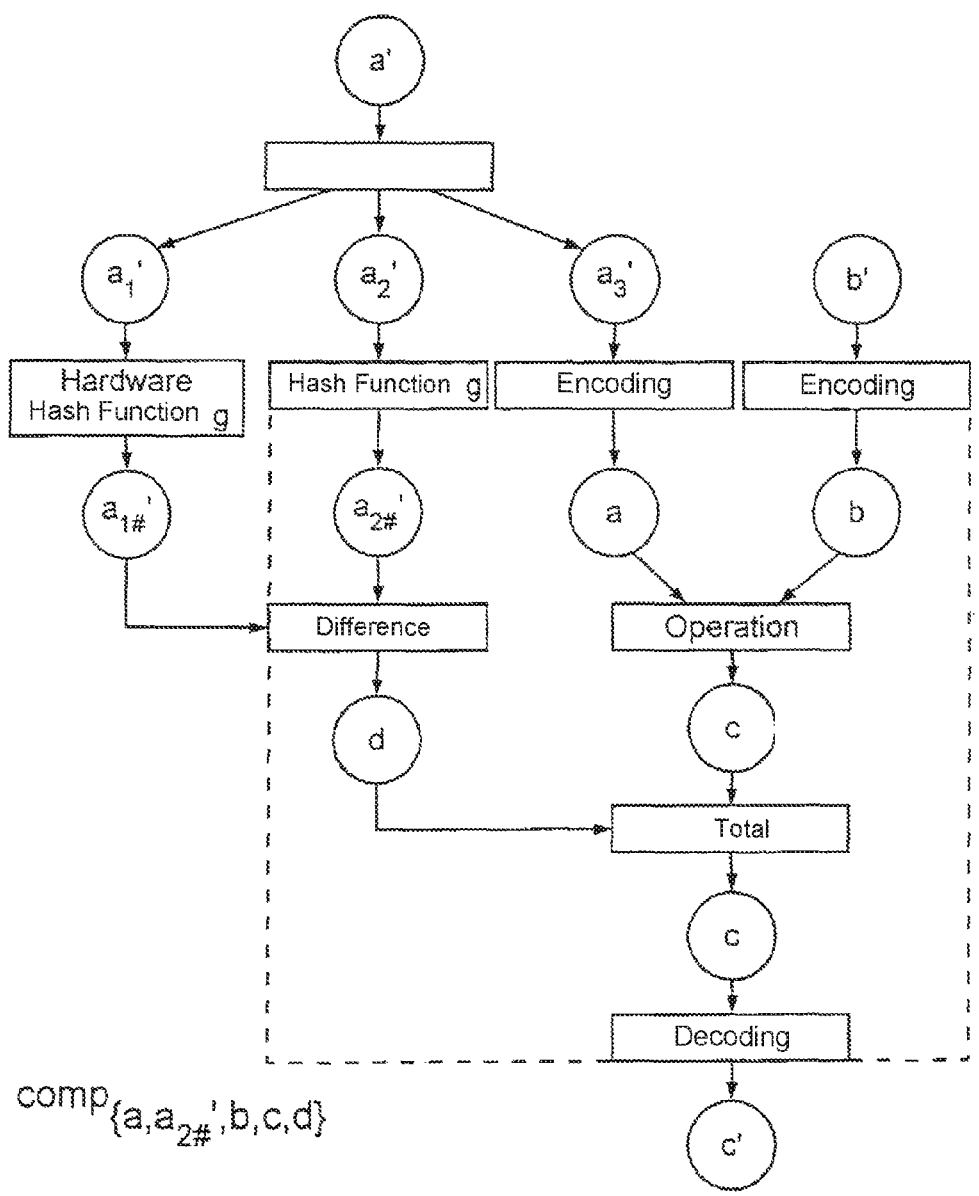
FIG. 31 shows a possible schema.

In FIG. 30 it is represented how a hardware encodes data of the application with a stream encoding. The value encoded by the hardware is decoded by the application. The decoding function is composed with an operation of the application. The result after executing the operation is encoded. Decoding with the aid of the inverse function of the hardware and encoding with the operation take place in parallel. The decoded value does not become visible for an aggressor at any moment. It does not play any role whether the hardware encodes and the application decodes or vice versa. It is essential that the linkage of the two functions is the identity. Parallel decoding and encoding is possible because only stream encodings are used. Other cryptological functions can also be used. Many known cryptological functions can be realised only with the aid of registers for memorising intermediate results, like multiple address results, e.g. These intermediate results must be stored in protected register databases. When one multiple address of a block encoding is a stream encoding, the last multiple address of this block decoding can be composed with the operation and the re-encodings of the operation. Instead of an encoding function, a hash function can also be executed in the hardware. FIG. 31 shows a possible schema. A part of the input into the hash function must remain secret. This part corresponds to the key in an encryption function. The other part of the input is data from the application. The output value of the hash function can be summed up to the result of an executed operation with the output value of a simulation of the hash function, e.g. through operations that compensate each other, like addition and subtraction. The result of such an executed operation is only correct when the hash function and its simulation yield the same value. The operation, the hash function or a multiple address of the hash function, respectively, the addition, the subtraction and all the re-encodings of the operation have to be composed. The secret part of the input into the hash function, and optionally intermediate results, must be stored in protected register databases.

Figure 32:
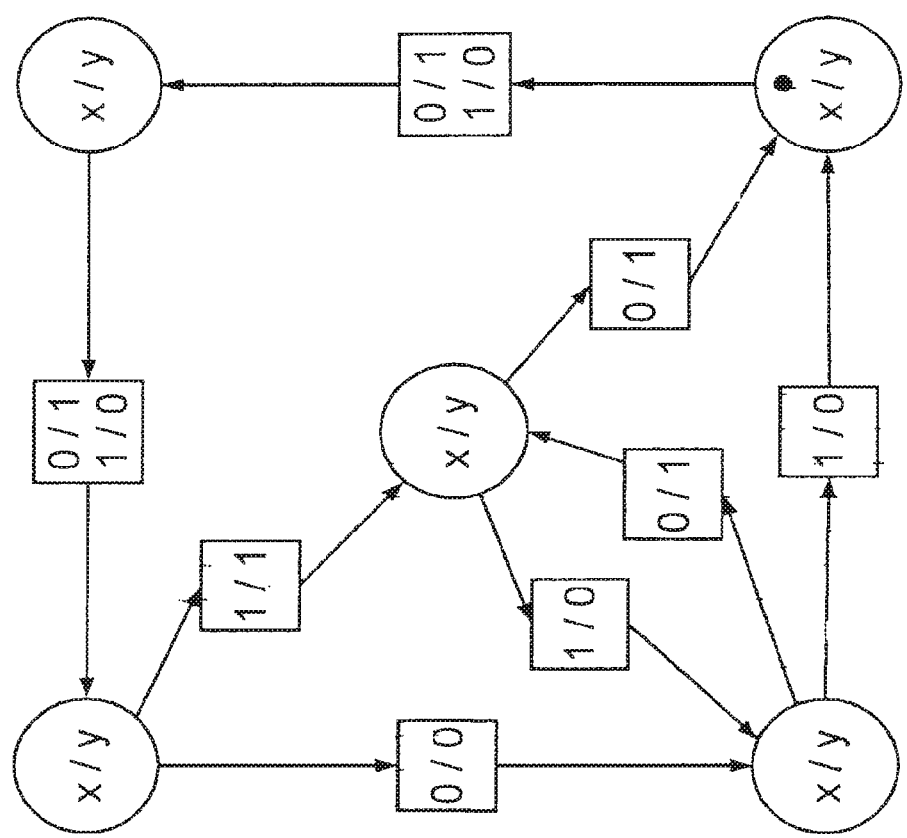
FIG. 32 shows one example for a sequential, reversible machine.

Sequential reversible machines can be used for encoding and decoding. One example for a sequential, reversible machine is represented in FIG. 32. In every state, at given output the input belonging to it can be unambiguously determined. Such machines with a significantly higher number of states than exemplified in FIG. 32 are suited for the composition with other nets, as is shown in FIG. 27a) and b), for instance. Machines with delayed outputs, as described in [3], are also conceivable. All the machines can be generated in a non-deterministic manner, for instance with the aid of random number generators.

REFERENCES

[1] Feng Bao, Yoshihide Igarashi, Break Finite Automata Public Key Cryptosystem, ICALP 1995: 147-158, 1995.
[2] T. L. Booth, Sequential Machines and Automata Theory, John Wiley and Sons, 1967.
[3] Zongduo Dai, Dingfeng Ye, Kwok-Yan Lam, Weak Invertibility of Finite Automata and Cryptoanalysis on FAPKC, Advances in Cryptology—ASIACRYPT '98: 227-241, Springer, 1998.
[4] W. Harder, B. Peeters, Vorrichtung zum Schutz gegen unauthorisierte Benutzung von Software, Patent DE 39142337, 1990.
[5] J. D. Hoperoft, J. D. Ullman, Einführung in die Automatentheorie, Formale Sprachen and Komplexitäts-theorie, 4. Auflange, Oldenbourg, 2000.
[6] E. Jessen, R. Valk, Rechensysteme, Grundlagen der Modellbildung, Springer, 1987.
[7] M. Minsky, Computation: Finite and Infinite Machines, Prentice-Hall, Englewood Cliffs, 1967.
[8] W. Reisig, Petri-Netze, Eine Einführung, Springer, 1982.
[9] R. Rojas, Theorie der neuronalen Netze, Springer 1993.
[10] D. R. Wallace, System and method for cloaking software, U.S. Pat. No. 6,192,475, 2001.
[11] Sospita, 2002.
[12] Syncrosoft Hard-und Software, GmbH, 2003.

[13] Trusted Computing Platform Alliance (TCPA), 2003.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to." Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent for from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependence from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompasses by the claims attached hereto.

The invention claimed is:

1. A computer-implemented method for obstructing analysis of a computer program, the method comprising:
   translating an operation of the computer program into a first data processing component;
   performing a composition of at least a second data processing component, the first data processing component, and a third data processing component to form a composed data processing component, the second data processing component being configured to interface with secure hardware included in a computer system executing the computer program, and
   replacing, in the computer program, the operation with an implementation of the composite data processing component to yield a protected version of the computer program;
   wherein the first data processing component, the second data processing component, and the third data processing component, comprise sequential machines $M_\Omega$ with input channels and output channels, C is a finite set of channels, $\Delta$ is a finite set of finite alphabets, $\gamma:C \to \Delta$, $\Omega=(C, \Delta, \gamma)$ is a communication rule, $$E_\Omega = \{e | e = \{(c,\sigma) | \sigma \in \gamma(c) \land ((c,\sigma_1) \in e \land (c,\sigma_2) \in e \Rightarrow \sigma_1 = \sigma_2)\}\} \cup \{\emptyset\}$$

is a set of input/output events and S is a finite set of states and $$M_\Omega := \{(S, E_\Omega, \delta, \beta, s_0) | \delta: R \to S \land \beta: R \to E_\Omega \land R \subset S \times E_\Omega$$
$$\land (\forall [(s,x),y] \in \beta \forall (c_x, \sigma_x) \in x \forall (c_y, \sigma_y) \in y : c_x \neq c_y)$$
$$\land s_0 \in S\}.$$

B with $B \subseteq C$ is a set of internal synchronization channels and the composition $\text{comp}_B : M_\Omega^n \to 2^{M_\Omega}$ of sequential machines is characterized by:

$$\text{comp}_B := \{((K_1, \ldots, K_n), \tilde{K}) \mid$$
$$(K_1, \ldots, K_n) = ((S_1, E_\Omega, \delta_1, \beta_1, s_{0_1}), \ldots, (S_n, E_\Omega, \delta_n, \beta_n, s_{0_n}))$$
$$\land \exists T = \{((x_1, \ldots, x_n), (y_1, \ldots, y_n), (s_1', \ldots, s_n'), \tilde{x}, \tilde{y}) \mid$$
$$([(s_{0_1}, x_1), s_1'], \ldots, [(s_{0_n}, x_n), s_n']) \in \delta_1 \times \ldots \times \delta_n$$
$$\land ([(s_{0_1}, x_1), y_1], \ldots, [(s_{0_n}, x_n), y_n]) \in \beta_1 \times \ldots \times \beta_n$$

$$\land \exists H_x = \bigcup_{i \in \{1,\ldots,n\}} x_i \exists H_y = \bigcup_{i \in \{1,\ldots,n\}} \beta_i(x_i):$$

$$H_x \in E_\Omega \land H_y \in E_\Omega$$
$$\land \forall (c, \sigma): (c \in B \Leftrightarrow (c, \sigma) \in H_x \cap H_y)$$
$$\land \tilde{x} = H_x \setminus H_y \land \tilde{y} = H_y \setminus H_x\}$$
$$\exists \tilde{M}_\Omega' = \{\tilde{K}' \mid \exists ((x_1, \ldots, x_n), (y_1, \ldots, y_n), (s_1', \ldots, s_n'), \tilde{x}, \tilde{y}) \in T:$$
$$\tilde{K}' = \text{comp}_B ([(S_1, E_\Omega, \delta_1, \beta_1, s_1'), \ldots, (S_n, E_\Omega, \delta_n, \beta_n, s_n')])\}:$$
$$\tilde{K} = (\tilde{S}, E_\Omega, \tilde{\delta}, \tilde{\beta}, \tilde{s}_0')$$

$$\land \tilde{S} = (s_{0_1}, \ldots, s_{0_n}) \cup \bigcup_{(\tilde{s}', E_\Omega', \tilde{\delta}', \tilde{\beta}', \tilde{s}_0') \in \tilde{M}_\Omega'} \tilde{S}'$$

$$\land \tilde{\delta} = \{[((s_{0_1}, \ldots, s_{0_n}), \tilde{x}), (s_1', \ldots, s_n')] \mid$$
$$((x_1, \ldots, x_n), (y_1, \ldots, y_n), (s_1', \ldots, s_n'), \tilde{x}, \tilde{y}) \in T\}$$

$$\bigcup_{(\tilde{s}', E_\Omega', \tilde{\delta}', \tilde{\beta}', \tilde{s}_0') \in \tilde{M}_\Omega'} \bigcup \tilde{\delta}'$$

$$\land \tilde{\beta} = \{[((s_{0_1}, \ldots, s_{0_n}), \tilde{x}), \tilde{y}] \mid$$
$$((x_1, \ldots, x_n), (y_1, \ldots, y_n), (s_1', \ldots, s_n'), \tilde{x}, \tilde{y}) \in T\}$$

$$\bigcup_{(\tilde{s}', E_\Omega', \tilde{\delta}', \tilde{\beta}', \tilde{s}_0') \in \tilde{M}_\Omega'} \bigcup \tilde{\beta}'$$

$$\land \tilde{s}_0 = (s_{0_1}, \ldots, s_{0_n})\}.$$

2. The method of claim 1, wherein the second data processing component comprises a cryptological component.

3. The method of claim 2, wherein the cryptological component is configured to interface with the secure hardware included in the computer system executing the computer program to receive cryptographic information.

4. The method of claim 1, wherein the third data processing component comprises a cryptological component.

5. The method of claim 4, wherein the cryptological component is configured to interface with secure hardware included in a computer system executing the computer program to receive cryptographic information.

6. The method of claim 1, wherein at least one output of the second data processing component is an input to the first data processing component and at least one output of the first data processing component is an input to the third data processing component.

7. The method of claim 1, wherein the cryptological component is randomly generated.

8. The method of claim 1, wherein at least one of the data processing components has more than one input.

9. The method of claim 1, wherein at least one of the data processing components comprises a watermarking component.

10. The method of claim 1, wherein at least one of the data comprise components comprises a component configured to deflate compressed data.

\* \* \* \* \*